(12) United States Patent  (10) Patent No.: US 8,775,723 B2
Suzuki  (45) Date of Patent: Jul. 8, 2014

(54) STORAGE SYSTEM AND CONTROL METHOD OF STORAGE SYSTEM

(75) Inventor: Akifumi Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 256 days.

(21) Appl. No.: 13/376,782

(22) PCT Filed: Nov. 22, 2011

(86) PCT No.: PCT/JP2011/006506
§ 371 (c)(1),
(2), (4) Date: Dec. 7, 2011

(87) PCT Pub. No.: WO2013/076763
PCT Pub. Date: May 30, 2013

(65) Prior Publication Data
US 2013/0132641 A1 May 23, 2013

(51) Int. Cl.
*G06F 12/02* (2006.01)
(52) U.S. Cl.
CPC ............................... *G06F 12/0246* (2013.01)
USPC ........................................................ 711/103
(58) Field of Classification Search
None
See application file for complete search history.

(56) References Cited

U.S. PATENT DOCUMENTS

2006/0282641 A1* 12/2006 Fujimoto et al. ............... 711/173
2010/0077133 A1*  3/2010 Jeon ............................... 711/103
2010/0257306 A1  10/2010 Kawaguchi
2011/0302358 A1* 12/2011 Yu et al. ......................... 711/103

FOREIGN PATENT DOCUMENTS

EP      1 876 519 A2    1/2008

OTHER PUBLICATIONS

PCT International Search Report and Written Opinion on application PCT/JP2011/006506 mailed May 9, 2012; 11 pages.
Pliant Lightning® LB Enterprise Flash Drives; 2011; , [online] Retrieved from the Internet: <URL http://www.sandisk.com/assets/umbraco/enterprise_storage/products/rightnav/pliantdatasheet-LB.pdf> Pliant Technology, Inc., Milpitas, USA; 2 pages.

* cited by examiner

*Primary Examiner* — Duc Doan
(74) *Attorney, Agent, or Firm* — Foley & Lardner LLP

(57) ABSTRACT

A storage system is provided with a plurality of nonvolatile semiconductor storage devices (hereafter referred to as semiconductor storage devices) and a storage controller that is coupled to the plurality of semiconductor storage devices and that provides an LU (logical unit) to an upper level apparatus. Each of the semiconductor storage devices is provided with a nonvolatile semiconductor storage medium (hereafter referred to as a semiconductor medium) and a medium controller that is a controller that is coupled to the semiconductor medium. In the case in which the medium controller receives a write command and a data unit from a storage controller, the medium controller writes the data unit to a physical storage region of a write destination of the semiconductor medium in accordance with the write command and updates the real write data amount information that is used for specifying a real write data amount that is a total amount of a data unit that is written to the semiconductor medium based on an amount of a data unit that has been actually written. The medium controller notifies the storage controller of the real write data amount information on a regular basis or on an irregular basis. The storage controller calculates a real write data amount of the LU based on the real write data amount information from each of the semiconductor storage devices.

13 Claims, 24 Drawing Sheets

| Virtual LU number | Total write data amount | Write data amount of LU #2 | Real write amount of LU #2 | Write data amount of LU #3 | Real write amount of LU #3 | Write data amount of LU #4 | Write data amount of LU #5 | Write data amount of LU #6 |
|---|---|---|---|---|---|---|---|---|
| 1 | | | | | | | | |
| 2 | | | | | | | | |
| 3 | | | | | | | | |

Write data amount information

| LU number | Storage medium | Bit cost | Write cost | Write IOPS | Read IOPS |
|---|---|---|---|---|---|
| 1 | SLC | $a | $e | g | k |
| 2 | SLC | $a | $e | g | k |
| 3 | MLC | $b | $f | h | l |
| 4 | HDD | $c | | i | m |
| 5 | HDD | $c | | i | m |
| 6 | Tape | $d | | j | n |

Storage medium characteristic table

| Virtual LU number | Priority setting | Expected write cost | Measured write cost | Predicted write cost |
|---|---|---|---|---|
| 1 | Performance | | | |
| 2 | Write cost | | | |
| 3 | Bit cost | | | |

Write cost table of a virtual LU

| LU number | Virtual page number | Read data amount | Write data amount | Real write data amount | Read/real write data amount | Virtual LU number |
|---|---|---|---|---|---|---|
| 2 | 0 | | | | | Unallocated |
| 2 | 1 | | | | | 2 |
| ⋮ | ⋮ | | | | | ⋮ |
| 3 | 411 | | | | | 1 |
| 3 | 412 | | | | | 2 |
| ⋮ | ⋮ | | | | | ⋮ |
| 4 | 523635 | | | | | 1 |
| ⋮ | ⋮ | | | | | ⋮ |
| 5 | 726030 | | | | | Unallocated |
| ⋮ | ⋮ | | | | | ⋮ |
| 6 | 60000000 | | | | | Unallocated |

Read/write information of a virtual page

| LBA | Virtual page number | PBA |
|---|---|---|
| 0x0000000000 | 1324 | 0x35AB242000 |
| 0x0000001000 | 1324 | 0x2B3A1D2000 |
| 0x0000002000 | 1324 | Unallocated |
| 0x0000003000 | 1324 | 0xDF20156000 |
| ⌇ | ⌇ | ⌇ |
| 0xFFFFFFD000 | 7401 | Unallocated |
| 0xFFFFFFE000 | 7401 | 0xAE00F04000 |

Logical physical conversion table

| PBA | FM number | Block number | Accumulated erasing number of times |
|---|---|---|---|
| 0x00000200000 | 1 | 1 | 1304 |
| 0x00000400000 | 1 | 2 | 1520 |
| | | | |
| 0x7FFFFE00000 | 1024 | 4096 | 1100 |

| | | |
|---|---|---|
| 1405 | Accumulated erasing sum | 5033164800 |
| 1406 | Remaining erasing sum | 7549747200 |
| 1407 | Degradation rate | 66% |

Block management information

| Virtual page number (1601) | Write data amount (1602) | Real write data amount (1603) |
|---|---|---|
| 1 | 88064MB | 264192MB |
| 2 | 92160MB | 119808MB |
| ⋮ | ⋮ | ⋮ |
| 356441 | 139264MB | 69632MB |

Virtual page write information

| | |
|---|---|
| Module LBA region (1701) | 0x60000000 ~0x62CFE000 |
| Virtual page number (1702) | 411 |

Fig. 17

STORAGE SYSTEM AND CONTROL METHOD OF STORAGE SYSTEM

TECHNICAL FIELD

The present invention relates to a storage system that is provided with a nonvolatile semiconductor storage device and a control method of the storage system.

BACKGROUND ART

An SSD (Solid State Drive), which is a storage device that is provided with a nonvolatile semiconductor storage medium (hereafter referred to as a semiconductor storage device), is publicly known. Since a high performance of a read and a write of data for the SSD can be obtained, the SSD is being utilized for a storage system. However, a semiconductor storage device is costly as compared with a storage device such as an HDD, and it is not suitable that all data that are stored in a storage system is stored into a semiconductor storage device from a point of view of a cost. On the other hand, it is known that a read write frequency is provided with a locality for data of a storage system in general. Consequently, in the case in which only data of a high read write frequency is stored into a semiconductor storage device and data of a low read write frequency is stored into a storage device such as an HDD (Hard Disk Drive), an average high performance of a storage system can be expected at a low cost.

The SSD described above is an electrically rewritable semiconductor storage device. The SSD is provided with a plurality of semiconductor storage media and data is stored into each of the semiconductor storage medium in general.

A semiconductor storage medium is composed of a plurality of cells and maintains two states for one cell to the passage of time. More specifically, one of the two states of a cell is a bit 1 and the other of the two states of a cell is a bit 0. For a flash memory that is one of semiconductor storage media for instance, a state in which an electron has been implanted to an FG (Floating Gate) of a cell is a bit 0 and a state in which an electron has not been implanted to an FG of a cell is a bit 1. In the case in which this state is maintained even if time elapses, data is held with propriety.

In recent years, a storage density of a semiconductor storage medium has been improved to lower a bit cost (a cost for holding data per bit). An improvement of a storage density is carried out by two methods for instance. One method is a miniaturization of a manufacturing process of a semiconductor storage medium. The other method is technique that is called a multiple value method, in which data of a plurality of bits is stored to one cell by classifying an implanted amount of an electron for one cell into a plurality of stages. By these techniques, a bit cost of a semiconductor storage medium is being lowered. However, a reliability related to a data hold is sacrificed by the reduction of a bit cost.

A deterioration of reliability due to a miniaturization and a multiple value method is caused by a reduction of a design margin. Since a cell is damaged by slow degrees due to a repetition of a write and an update of storage data as a characteristic of a semiconductor storage medium, a specific state cannot be held for a long period of time and is changed. In the case in which a design margin to a permissible amount of the change, the storage data can be held even if a state is changed. However, in the case in which a design margin is less, the storage data is changed even if a state change is minute. For instance for a flash memory, it is known that a hole trap is generated in an oxidation insulation film for keeping an electron that has been stored to an FG and an insulation property is degraded. In the case in which a design margin is reduced by the miniaturization and the multiple value method, an influence of an electron amount change in an FG due to a degradation of an insulation property is easily applied relatively, and it is difficult to hold data on a long-term basis. Consequently, a life of a semiconductor storage medium is to a damage state in which a reliability can be maintained, and the total update write data amount (hereafter referred to as write data amount) to each region of a semiconductor storage medium must be limited.

Due to a limitation of a write data amount of a semiconductor storage medium, in recent years, a product in which a write data amount is limited has been published for an SSD in which an element is a storage device (see Non Patent Literature 1 for instance). For an SSD in which a write data amount is limited, even in the case in which an indemnity period is 5 years, at a time when a write data amount to an SSD exceeds a permissible value, a guaranty of a reliability related to a storage hold of data cannot be held and a life of an apparatus is ended. Consequently, a life of a storage system that is provided with an SSD is decided in accordance with the write data amount. In the case in which a storage system is tried to be operated continuously, it is necessary that an SSD that outlives its usefulness is exchanged. In this case, since a life of an apparatus is shortened according to a write data amount, an operation cost of a storage system for a certain period is varied by a write data amount. In the case in which a write data amount of a system is larger, an SSD is degraded and an operation period of the total storage system is shortened, whereby a cost is increased.

On the other hand as described above, for an HDD that is one of storage devices of a low performance and a low bit cost, a limitation of a write data amount is less than that of an SSD. Consequently, for an HDD, a cost for updating write data (hereafter referred to as a write cost) as well as a bit cost is lower than that of an SSD. For a storage system that is composed of a plurality of storage devices including an HDD and an SSD, it is necessary that not only a bit cost is considered but also a write cost is considered in order to select a storage destination of data.

Moreover, in the case in which an operation period (a duration period) of a storage system has a priority over a performance (that is, a write cost is equal to or less than a certain value), it is thought that an operation period of a storage system is extended by setting that data of much write data amount is stored into an HDD.

Moreover, in the case in which a storage system is shared by a plurality of services (applications), it is necessary that the total amount of data that has been written to an SSD by each service (a write data amount) is considered to estimate an operation cost for every service in an accurate fashion. For instance, in the case in which a life of a storage system in which a life of 5 years is expected is 3 years due to an influence of a specific service in which a large amount of data has been written to an SSD among a plurality of services that share an SSD for a storage system, a user must recognize that an operation cost of a specific service in which a life is shortened is higher than that of other services.

CITATION LIST

Non Patent Literature

NPL 1:
http://www.sandisk.com/Assets/Umbraco/Enterprise_Storage/Products/RightNav/Plian tDatasheet-LB.pdf

SUMMARY OF INVENTION

Technical Problem

To implement a desirable life of a storage system and a desirable operation cost of a service as described above, it is preferable to recognize a write data amount to a semiconductor storage device for every service (the total amount that has been transmitted to a semiconductor storage device) in an accurate fashion and to select a semiconductor storage device that is corresponded to a service in consideration of a write data amount. At this time, it is preferable to judge not a write data amount to the semiconductor storage device but a write data amount to a semiconductor storage medium in a storage device in order to select a semiconductor storage device in an effective manner. This is because a write data amount to the semiconductor storage device is not corresponded to a write data amount that is stored into a semiconductor storage medium in a semiconductor storage device as a practical matter in general and the write data amount is varied in accordance with an access pattern or the like.

However, for a conventional storage system, although a write data amount to the semiconductor storage device can be measured, the total amount of data that is stored into a semiconductor storage medium in a storage device as a practical matter (hereafter referred to as a real write data amount) cannot be measured.

Some examples of a reason why a write data amount to a semiconductor storage device is different from a real write data amount to a semiconductor storage medium in the semiconductor storage device will be described in the following.

(1) A flash memory that is most used as a semiconductor storage medium is provided with a characteristic in which an overwriting of storage data is impossible. Consequently, in the case in which data is updated, after erasing is carried out once and data is stored newly. However, since a minimum erasing unit is smaller than a minimum read write unit, in the case in which there is data that has been stored into a region that is an erasing target for a semiconductor storage medium, the data must be moved to other area (other region in a semiconductor storage medium) (this operation is called reclamation in general). In other words, a write of data to a semiconductor storage medium occurs not only in the case in which data is transmitted to a semiconductor storage device but also in the case in which reclamation is carried out. Consequently, a real write data amount to a semiconductor storage medium in the semiconductor storage device is larger than a write data amount to a semiconductor storage device. The increasing ratio is called WA (Write Amplification) in general. WA is varied in accordance with a write pattern. For instance, in the case in which a write target address is continued (a sequential write), WA is reduced. This is because locality occurs to a region to be updated (that is, a region that can be deleted) and data that is required to be moved to other area that is included in an erasing target region is less (a region that is less moved to other area has a high probability of being selected as an erasing target). On the other hand, in the case in which a data update is carried out in a random manner, WA is increased. This is because there is a high probability that a relatively large amount of data that is required to be moved to other area is included in an erasing target region as compared with the above sequential write relatively.

(2) In the case in which an update data amount (an amount of data that is written to the semiconductor storage medium by one write for instance) is smaller than a minimum write unit of a semiconductor storage medium, WA is also increased. In the case in which data of 512 B as a write target is transmitted to a semiconductor storage device for instance, when a minimum write unit is 8192 B, a write of data 16 times larger than a size of data to a semiconductor storage device is carried out to a semiconductor storage medium in the semiconductor storage device.

(3) In the case in which an SSD is provided with a compression function and a duplication exclusion function moreover, a real write data amount to a semiconductor storage medium is varied for a write of data that is provided with a high compression effect and a high duplication exclusion effect and the other data.

As described above, a storage system cannot measure a write data amount to a semiconductor medium in an accurate fashion by a variation of WA due to a variety of elements. Consequently, in the case in which a storage system is an apparatus that selects a semiconductor storage device of a write destination based on a write data amount to a semiconductor storage device, there is a possibility that a life of a storage system cannot be a life that is expected by a user. In the case in which an operation cost of a service is estimated, there is a possibility that a real write data amount to a semiconductor storage device cannot be measured in an accurate fashion and an estimate of an operation cost for every service cannot be carried out in an accurate fashion.

An object of the present invention is to provide a storage system that can measure a real write data amount to a semiconductor storage medium in a semiconductor storage device.

Solution of Problem

A storage system that is coupled to an upper level apparatus is coupled to a plurality of semiconductor storage devices and is provided with a storage controller that is coupled to the plurality of semiconductor storage devices and that provides an LU (logical unit) to the upper level apparatus. The storage controller receives a write request that specifies the LU from the upper level apparatus and transmits a write command of a data unit based on data of a write target that complies with the write request to a semiconductor storage device of a write destination that is a basis of a storage region of a write destination of the plurality of semiconductor storage devices in accordance with the write request.

Each of the semiconductor storage devices is provided with a semiconductor storage medium and a medium controller that is a controller that is coupled to the semiconductor storage medium. The medium controller holds the real write data amount information that is used for specifying a real write data amount that is a total amount of a data unit that is written to the semiconductor storage medium.

In the case in which the medium controller receives a write command and a data unit from a storage controller, the medium controller executes the following (a1) and (a2):

(a1) the medium controller writes the data unit to a physical storage region of a write destination of the semiconductor storage medium in accordance with the write command; and (a2) the medium controller updates the real write data amount information based on an amount of a data unit that has been actually written in the (a1).

The medium controller notifies the storage controller of the real write data amount information on a regular basis or on an irregular basis. The storage controller calculates a real write data amount of the LU based on the real write data amount information from the medium controller of each of the semiconductor storage devices.

Advantageous Effects of Invention

By the present invention, a storage system can calculate a real write data amount to a semiconductor storage medium in a semiconductor storage device.

BRIEF DESCRIPTION OF DRAWINGS

FIG. 9 is a view showing the write data amount information in accordance with an embodiment 1.

FIG. 10 is a view showing a storage device characteristic table in accordance with an embodiment 1.

FIG. 11 is a view showing a write cost table of a virtual LU in accordance with an embodiment 1.

FIG. 12 is a view showing the read/write information of a virtual page in accordance with an embodiment 1.

FIG. 14 is a view showing a logical physical conversion table in accordance with an embodiment 1.

FIG. 15 is a view showing the block management information in accordance with an embodiment 1.

FIG. 16 is a view showing the virtual page write information in accordance with an embodiment 1.

FIG. 17 is a view showing the virtual page update information in accordance with an embodiment 1.

DESCRIPTION OF EMBODIMENTS

Figure 1:
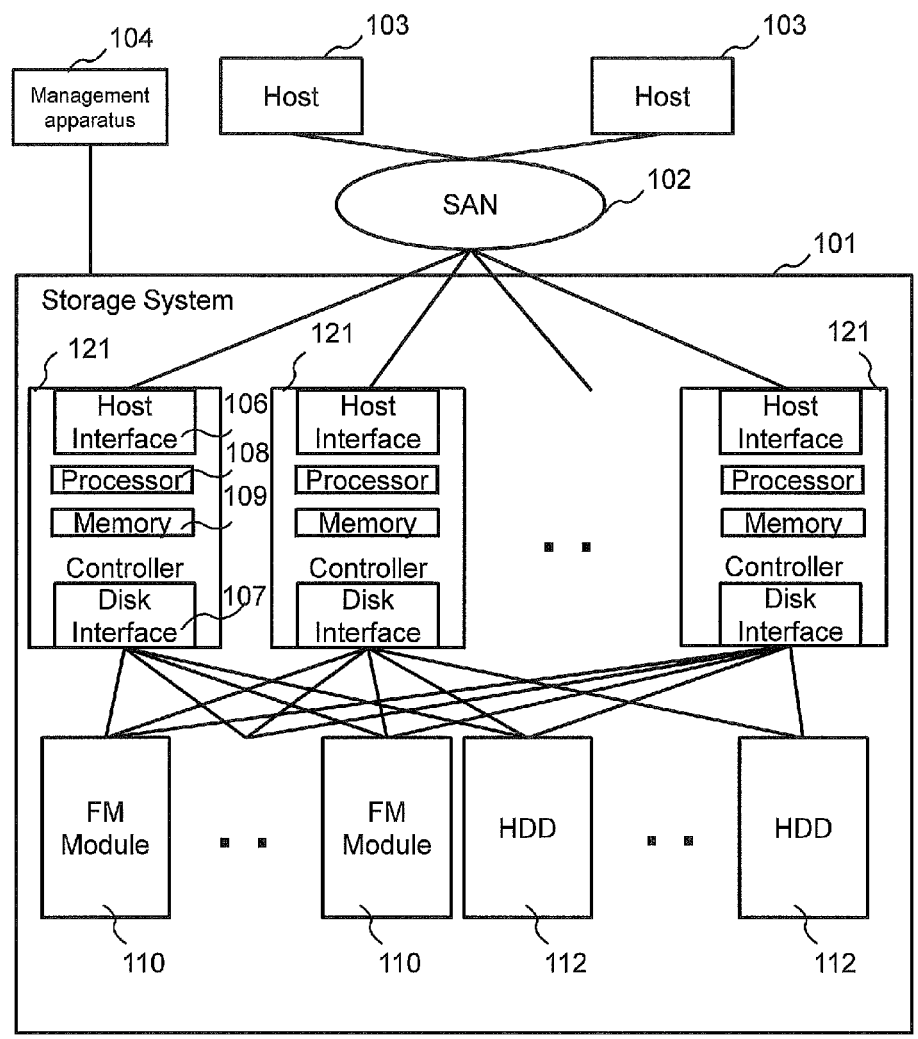
FIG. 1 is a view showing an outline configuration of a computer system in accordance with an embodiment 1.

Some of embodiments of the present invention will be described below in detail with reference to the drawings.

In the following descriptions, while a wide variety of information will be described in the expression of "xxx information" and "xxx table" in some cases, a wide variety of information can be represented by any data structure. In order to indicate that a wide variety of information is not depended on a data structure, the expression of "xxx table" can also be referred to as "xxx information".

In the following descriptions, the processing will be described while a "program" is handled as a subject in some cases. In the case in which the program is executed by a processor (for instance, a CPU (Central Processing Unit)) that is described later, the processor executes the predetermined processing by using a storage resource (such as a memory that is described later) and/or a communication interface apparatus (such as a communication port) as it decides proper. Consequently, a subject of a processing can also be a processor. The processing that is described while a program is handled as a subject can also be a processing that is executed by a storage system, a storage controller that is included in the storage system, or an MP (microprocessor) that is included in the controller. Moreover, the processor can include a hardware circuit that executes a part or a whole of a processing that is executed by a processor. A computer program can be installed from a program source to each of the computers. The program source can be a program distribution server or a storage medium for instance.

In the following descriptions, in the case in which the same elements are classified for an explanation, an identification number of the element is used as substitute for a reference sign of the element in some cases. For instance a page of the identification information (identification number) "1" is noted as a "page #1" in some cases.

The management apparatus is provided with an input/output device. An example of the input/output device is thought to be a display, a keyboard, and a pointer device. However, the input/output device can also be a device other than the above devices. Moreover, as substitute for an input/output device, a serial interface and an Ethernet interface (Ethernet is a registered trademark) can be used as an input/output device. A display apparatus that is provided with a display, a keyboard, or a pointer device can be coupled to the interface. The display apparatus can be used for a display by transmitting the display information to the display apparatus or by receiving the input information from the display apparatus. An input can be accepted as substitute for an input and a display of an input device. Hereafter an aggregate of at least one computer that manages a storage system is referred to as a management system. In the case in which a management apparatus displays the display information, the management apparatus is a management system. Moreover, a combination of the management apparatus and the display apparatus is also a management system. A plurality of computers can be used for implementing a processing equivalent to that of the management apparatus for a high speed management processing and a highly reliable management processing. In this case, the plurality of computers (including a display apparatus in the case in which a display apparatus executes a display) is a management system. In the following embodiment, the management apparatus is a management system.

In the following descriptions, an upper level apparatus (a host 103 in an example shown in the figure) is corresponded to one service (for instance, a service for an application or a work of each section). In other words, an upper level apparatus is corresponded to a service on a one-to-one basis. Consequently, by measuring a read amount and/or a write amount (hereafter referred to as a read/write amount) of each of the upper level apparatuses, a read/write amount for every service can be measured. Although it is not shown, a storage system comprehends a correspondence of an upper level apparatus and a virtual LU described later. In this case, by comprehending a read/write amount of a virtual LU, a read/write amount for every service can be comprehended. It is not necessary that an upper level apparatus is corresponded to a service on a one-to-one basis. An upper level apparatus can be corresponded to a service on a one-to-multiple basis or on a multiple-to-one basis. In this case, the information that indicates a correspondence relationship between an upper level apparatus and a service can be stored into a management system as substitute for or in addition to a storage system. A read amount of a service is the total amount of data that is read by an upper level apparatus by executing a service, and a write amount of a service is the total amount of data that is written by an upper level apparatus by executing a service A storage system can be one storage apparatus or can be a combination of a plurality of storage apparatuses. The storage apparatus is provided with at least one nonvolatile semiconductor storage devices (such as an FM module and/or an HDD described later) and a storage controller that is coupled to the nonvolatile semiconductor storage devices. The storage system is provided with a plurality of nonvolatile semiconductor storage devices and a control part that is coupled to the nonvolatile semiconductor storage devices. In the case in which the storage system is configured by a plurality of storage apparatuses, the control part can include a plurality of storage controllers that are included in a plurality of storage apparatuses.

In the following descriptions, a storage system is a hierarchical storage system. The storage system provides a virtual logical volume (hereafter referred to as a virtual LU) that conforms to Thin Provisioning and is provided with a Volume Pool (hereafter referred to as a pool) that is configured by a plurality of virtual pages. The virtual LU is divided into a plurality of LU regions and managed. The storage system allocates a free virtual page (a virtual page in the state in which the virtual page can be allocated) of a plurality of virtual pages to an LU region of a write destination. A pool is configured by a plurality of virtual page groups of different hierarchies (typically an access performance and/or reliability). A virtual page group is one pool LU or a plurality of pool LUs. A pool LU is a normal LU that configures a pool (an LU of a type other than a virtual LU). The pool LU can be a logical volume based on at least one storage device (such as an FM module and/or an HDD (Hard Disk Drive) described later) that is included in the storage system, or can be a virtual logical volume to which a logical volume of an external storage system that is coupled to a storage system is mapped (that is, a logical volume that conforms to a so-called storage virtualization technique). However, the storage system is not restricted to the hierarchical storage system described above. In the case in which the storage system is not a hierarchical storage system, an upper level apparatus is directly corresponded to a normal LU as substitute for the correspondence of the upper level apparatus and the virtual LU. The storage system (or the management system) can comprehend a read/write amount for every service by comprehending the correspondence of the upper level apparatus and the normal LU.

Embodiment 1

An embodiment 1 of the present invention will be described below in detail with reference to the drawings. The present invention is not restricted to the embodiments described in the following. A NAND type flash memory (hereafter simply referred to as a flash memory) will be described as an example of a semiconductor storage medium. However, a semiconductor storage medium is not restricted to a flash memory. The present invention can also be applied to a semiconductor storage medium in which an amount of data that can be stored is limited by a damage of a storage medium due to a write.

FIG. 1 is a view showing an outline configuration of a computer system in accordance with an embodiment 1 of the present invention. A flash memory module (hereafter referred to as an FM module) 110 shown in FIG. 1 is a semiconductor storage device in which a flash memory is a semiconductor storage medium.

A computer system is provided with a storage system 101, one or a plurality of upper level apparatuses (hereafter referred to as a host) 103, and a management apparatus 104.

The storage system 101 is provided with one or a plurality of storage controllers 121 (four storage controllers in the example shown in the figure). Each of the storage controllers 121 are provided with a host interface 106 that is coupled to one or a plurality of hosts 103, a disk interface 107 that is coupled to one or a plurality of storage devices (a plurality of FM modules 110 and a plurality of HDDs 112 in the example shown in the figure), a processor 108, and a memory 109.

The host interface 106 is a device that is corresponded to a wide variety of protocols such as an FC (Fibre Channel), an iSCSI (internet Small Computer System Interface), and an FCoE (Fibre Channel over Ether). The disk interface 107 is a device that is corresponded to a wide variety of protocols such as an FC, a SAS (Serial Attached SCSI), a SATA (Serial Advanced Technology Attachment), and a PCI (Peripheral Component Interconnect)-Express. The storage controllers 121 to 123 execute a read from a storage device or a write to a storage device in accordance with a read request or a write request (hereafter referred to as a read/write request in some cases) from the host 103 under the control of the processor 108.

The storage controller 121 is provided with a function for creating a parity in accordance with a RAID (Redundant Array Inexpensive Disk) and a function for restoring data by using a parity in accordance with a RAID, and manages devices such as a plurality of FM modules 110 and a plurality of HDDs 112 as a RAID Group in any unit. It is preferable that the RAID Group is configured by nonvolatile semiconductor storage devices of the same type (for instance, nonvolatile semiconductor storage devices that are provided with the equivalent access performance and the equivalent reliability). It is preferable that an FM module and an HDD are not mixed to one RAID group for instance. Moreover, the storage controller 121 can divide a RAID Group as an LU (Logical Unit) in any unit and can provide the LU as a storage region to the host 103.

The description of this paragraph is an explanation of an example in the case in which a read/write of data is carried out to a storage region that conforms to the RAID Group that requires the parity. In the case in which a write request from the host 103 to an LU is received, the storage controller 121 creates a parity that is corresponded to a RAID level of the RAID Group that is a basis of a storage region of a write destination (for instance, a storage region of a normal LU or a virtual page that is allocated to a virtual LU), and writes data that conforms to the write request and a parity that has been created to a plurality of nonvolatile semiconductor storage devices (HDDs or FM modules) that configure the RAID Group. In the case in which a read request from the host 103 to an LU is received, the storage controller 121 reads data and a parity from a plurality of nonvolatile semiconductor storage devices that configure the RAID Group that is a basis of a storage region of a read source (for instance, a storage region of a normal LU or a virtual page that is allocated to a virtual LU), and judges whether or not the data that has been read suffers a data loss. In the case in which a data loss is not detected, the storage controller 121 transfers the data that has been read to the host 103. In the case in which a data loss is detected, the storage controller 121 restores data by using a parity that has been read and transfers the data that has been restored to the host 103.

The storage controller 121 is provided with a function for monitoring and managing a failure, a situation of use, and a situation of an operation for each of the storage devices.

The storage system 101 is coupled to the management apparatus 104 via a communication network. This communication network is a LAN (Local Area Network) for instance. This communication network is also coupled to each of the storage controllers 121 in the storage system 101 (not shown). This communication network can also be a SAN (Storage Area Network) or a communication network of other type.

The management apparatus 104 is a computer that is provided with a hardware resource such as a processor, a memory, a network interface, and an input/output device that includes a display device and a software resource such as a management program (not shown). The management apparatus 104 acquires the information from the storage system 101 and displays a management screen 2000 (see FIG. 20) to the display device. A user (for instance, a system manager) can monitor and operate the storage system 101 by using the management screen 2000. The management apparatus 104 can be substituted by the host 103 that is provided with a function of a management apparatus. A user can input a wide variety of policies to the management apparatus 104 through the management screen 2000. A policy can be a policy related to a write cost such as a setting of a write cost of a virtual LU for instance. The details will be described later.

The storage system 101 is provided with a plurality of (16 for instance) physical storage devices. The plurality of storage devices are coupled to a plurality of storage controllers 121 to 123 in the storage system 101 via a disk interface 107. The storage device stores data in accordance with a write request from the storage controllers 121 to 123. Moreover, data that has been stored into the storage device is transferred to the storage controller 121 in accordance with a read request from the storage controllers 121 to 123. At this time, the disk interface 107 specifies a logical store location of data that is a target of a read/write request by a logical address (hereafter referred to as an LBA: Logical Block Address). A plurality of storage devices are managed as one or a plurality of RAID Groups in some cases. In this case, data that has been lost can be restored.

The plurality of storage devices can include a plurality of storage devices of different types such as a plurality of FM modules 110, a plurality of HDDs (Hard Disk Drive) 112, and a plurality of tapes (not shown). Each of the FM modules 110 is provided with a flash memory of the same type. For instance, the FM module 110 can be an FM module that is provided with a plurality of flash memories of an SLC (Single Level Cell) Type or an FM module that is provided with a plurality of flash memories of an MLC (Multi Level Cell) Type. A bit cost is higher and a write cost is lower for a flash memory of the SLC Type as compared with a flash memory of the MLC Type. This is because a limit value of a real write data amount of a flash memory of the SLC Type is larger than that of a flash memory of the MLC Type and a write of a relatively large amount can be carried out for a flash memory of the SLC Type.

The storage system 101 is coupled to the host 103 via a SAN 102. More specifically, each of the storage controllers 121 and the host 103 are coupled to each other via the host interface 106 by the SAN 102. The storage system 101 is also provided with a connection path for communicating data and control information with each other (not shown). A communication network of other type can also be adopted as substitute for the SAN 102.

The host 103 is a device such as a computer and a file server that is a central core of a work system for instance. The host 103 is provided with a hardware resource such as a processor, a memory, a network interface, and an input/output device. The host 103 is also provided with a software resource such as a device driver, an operating system (OS), and an application program. The host 103 executes a wide variety of programs under the control of a processor to communicate with the storage system 101 and to execute a read/write request of data. Moreover, the host 103 executes a wide variety of programs under the control of a processor to acquire the management information related to a situation of use and a situation of an operation of the storage system 101. Moreover, the host 103 can specify and modify a management unit of a storage device, a control method of a storage device, and a setting of a data compression. The FM module 110 shown in FIG. 1 is coupled to the host 103 via the storage controllers 121 to 123 in the storage system 101. However, the present invention is not restricted to this configuration, and the FM module 110 can also be coupled directly to a host that is provided with a disk interface and a management program.

Figure 2:
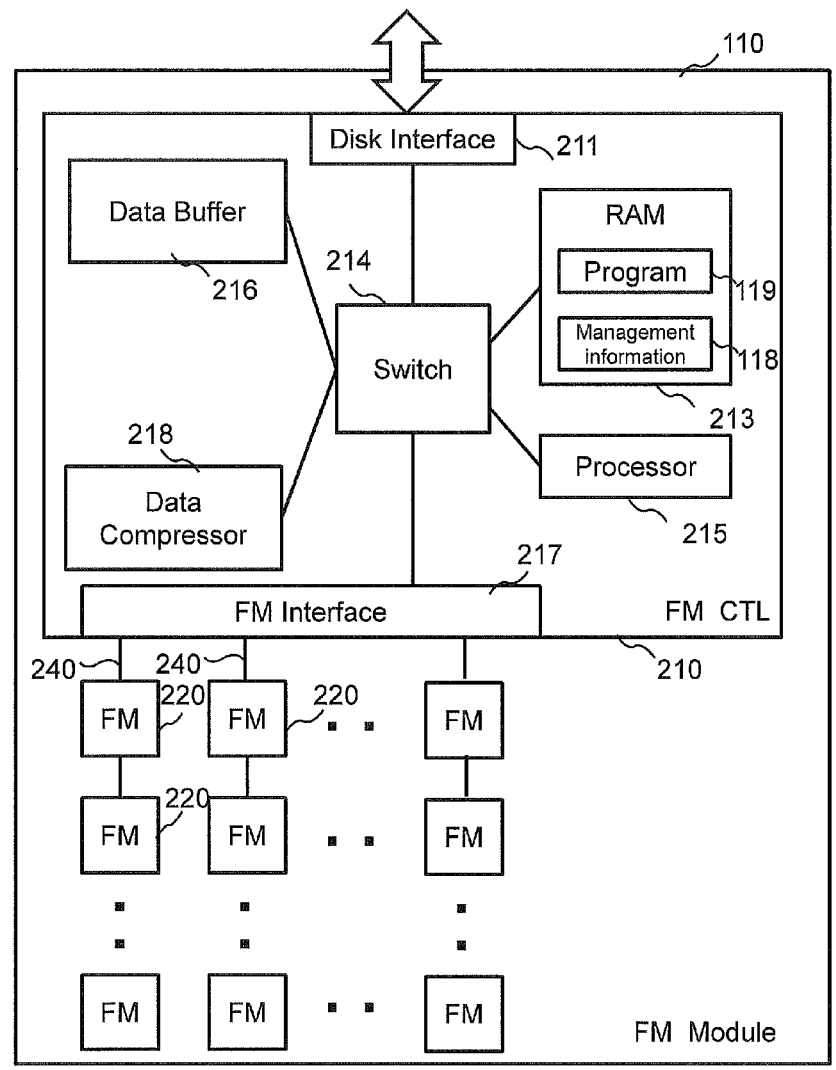
FIG. 2 is a view showing an internal configuration of an FM module in accordance with an embodiment 1.

FIG. 2 is a view showing an internal configuration of the FM module 110.

The FM module 110 is provided with a flash memory controller (hereafter referred to as an FM controller) 210 and a flash memory that is coupled to the FM controller 210. The flash memory is provided with a plurality of (32 for instance) flash memory chips (hereafter referred to as FM chips) 220.

The FM controller 210 is provided with a processor 215, a RAM 213, a data compression/extension unit 218, a data buffer 216, a disk interface 211, an FM chip interface (hereafter referred to as an FM interface) 217, and a switch 214 for executing a data transfer of each device with each other.

The switch 214 is coupled to a processor 215, a RAM 213, a data compression/extension unit 218, a data buffer 216, a disk interface 211, and an FM interface 217 in the FM controller 210, and execute a routing of data between devices by an address or an ID.

The disk interface 211 is coupled to a disk interface 107 that is included in at least one storage controller (for instance, all storage controllers) 121. The disk interface 211 receives a read request and an LBA that is a request target from the disk interface 107. The disk interface 211 receives a write request, an LBA that is a request target, and the write data from the disk interface 107.

Moreover, the disk interface 211 is coupled to each device in the FM controller 210 via the switch 214. Moreover, the disk interface 211 notifies the storage controller 121 of a situation of an operation, a situation of use, and a current setting value of the FM module 110 in accordance with a control command of the FM module 110.

The processor 215 is coupled to each device in the FM controller 210 via the switch 214, and controls the entire of the FM controller 210 based on a program 119 and the management information 118 that have been stored into the RAM 213. Moreover, the processor 215 monitors the entire of the FM controller 210 by a function of a periodic information acquisition and a function of an interrupt receiving. The processor 215 transmits a read/write request that has been received by the disk interface 211 to the FM interface 217. At this time, the processor 215 converts an LBA of a request target into a physical address (hereafter referred to as a PBA: Physical Block Address) of the FM chip 220.

The data buffer 216 is a temporary data stored region.

The FM interface 217 is coupled to a plurality of FM chips 220 via a plurality of (16 for instance) basses 240. Each of the basses 240 is coupled to a plurality of (2 for instance) FM chips 220. A plurality of FM chips 220 that are coupled to the same bass 240 is controlled by using a CE (Chip Enable) signal (not shown).

The FM interface 217 is operated in accordance with a read/write request of the processor 215. A request target is specified by a PBA. The FM interface 217 that has received a read/write request and a PBA of the request target identifies a physical page that is a target of a read/write request from the PBA that has been received, and executes a read/write to the physical page that has been identified.

In the case in which a read request occurs, the FM interface 217 reads data from the FM chip 220 and transmits the data to the data buffer 216. In the case in which a write request occurs, the FM interface 217 calls write data from the data buffer 216 and transmits the write data to the FM chip 220.

Although it is not shown, the FM interface 217 is provided with an ECC creation circuit, a data loss detection circuit by an ECC, and an ECC correction circuit. In the case in which a write request occurs, the FM interface 217 adds an ECC to the write data. In the case in which a read request occurs, the FM interface 217 inspects data that has been transmitted from the FM chip 220 by using the data loss detection circuit by an ECC, and corrects the data by using the ECC correction circuit in the case in which a data loss is detected for the data.

The data compression/decompression 218 is provided with a function for processing an algorithm of a reversible compression, algorithms of a plurality of types, and a modification function of a compression level. The data compression/decompression 218 reads data from the data buffer 216 in accordance with an instruction from the processor 215, executes a data compression operation or a data decompression operation that is a reverse conversion of a data compression by an algorithm of a reversible compression, and writes the result to the data buffer 216. The data compression/decompression 218 can also be mounted as a logical circuit. Moreover, the equivalent function can also be implemented by processing a compression/decompression program with the processor 215.

The switch 214, the disk interface 211, the processor 215, the data buffer 216, the FM interface 217, and the data compression/decompression 218 that have been described above can be arranged on one circuit board as an ASIC (Application Specific Integrated Circuit) or an FPGA (Field Programmable Gate Array), or can be a configuration in which a plurality of individual dedicated ICs (Integrated Circuits) are coupled to each other.

The RAM 213 can also be a volatile memory such as a DRAM. The RAM 213 stores the program 119, the management information 118 of the FM chips 220 to 228, and a transfer list that includes the transfer control information that is used by a DMA (Direct Memory Access). The RAM 213 can include a part or a whole of functions of the data buffer 216.

Figure 3:
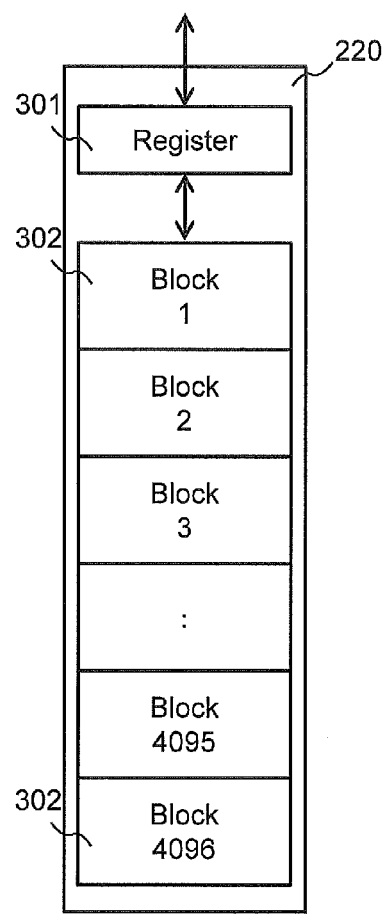
FIG. 3 is a view showing an internal configuration of an FM chip in accordance with an embodiment 1.

FIG. 3 is a view showing an internal configuration of the FM chip 220.

The FM chip 220 is internally provided with a plurality of (4096 for instance) physical blocks 302 that are nonvolatile memory regions. The data is erased in a physical block unit. The FM chip 220 is internally provided with an I/O register 301. The I/O register 301 is provided with a storage capacity of a size equivalent to or larger than a size (8 KB for instance) of a physical page described later The FM chip 220 is operated in accordance with a read/write request from the FM interface 217. In the case of a write request, the FM chip 220 receives a specification of a physical block and a physical page that are targets of a write request from the FM interface 217. In the next place, the FM chip 220 stores the write data that has been transmitted from the FM interface 217 into the I/O register 301. After that, the FM chip 220 writes the write data that has been stored into the I/O register 301 to the target physical page.

In the case of a read request, the FM chip 220 receives a specification of a physical block and a physical page that are targets of a read request from the FM interface 217. In the next place, the FM chip 220 reads data that has been stored into the physical page of the target physical block and stores the data into the I/O register 301. After that, the FM chip 220 transmits the data that has been stored into the I/O register 301 to the FM interface 217.

Figure 4:
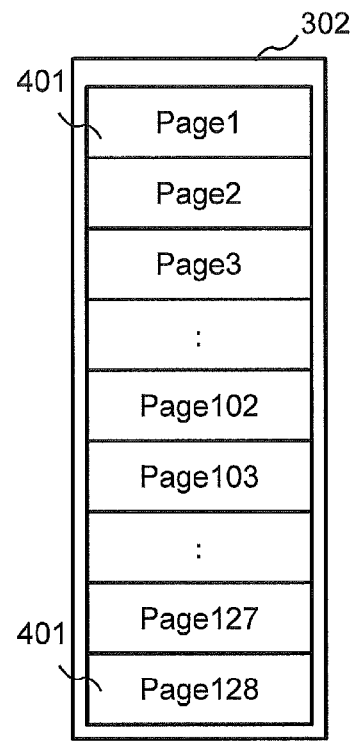
FIG. 4 is an explanation drawing of a physical block in accordance with an embodiment 1.

FIG. 4 is an explanation drawing of a physical block 302.

The physical block 302 is divided into a plurality of (128 for instance) physical pages 401. A read/write of data to the physical block 302 is executed in a physical page unit. A sequence of a write of data of the physical page 401 in the physical block 302 is fixed, and it is necessary that data is written in a numerical order of a page (for instance, #1, #2, #3 . . . ). An overwriting of data cannot be carried out to the physical page 401. Consequently, data cannot be newly written to a physical page to which the data before an update has been stored in the case in which data is not erased for every physical block to which the physical page belongs.

Figure 5:
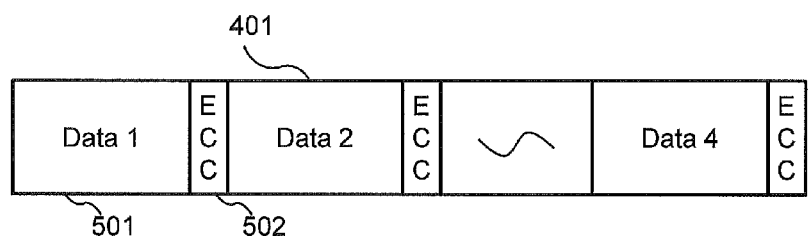
FIG. 5 is a view showing an internal configuration of a physical page in accordance with an embodiment 1.

FIG. 5 is a view showing an internal configuration of the physical page 401.

The physical page 401 stores data of bits of a constant number (for instance, 4 KB). The physical page 401 stores the data 501 and an ECC 502 that has been added by the FM interface 217. In this paragraph, data to which the ECC 502 is added is noted as protection data. One ECC CW (ECC Code Word) that is a data unit that includes the protection data 501 and the ECC 502 that has been added to the protection data 501 is configured for instance. The ECC CW is stored into the physical page 401.

FIG. 5 shows a configuration in which three ECC CWs are stored in one page. However, ECC CWs of any number can be stored into one page in accordance with a size of a physical page and a strength of an ECC (the number of correction enable bits). In the above configuration, in the case in which the number of failure bits per ECC CW exceeds the number of ECC correction failure bits, a data loss failure occurs.

Figure 6:
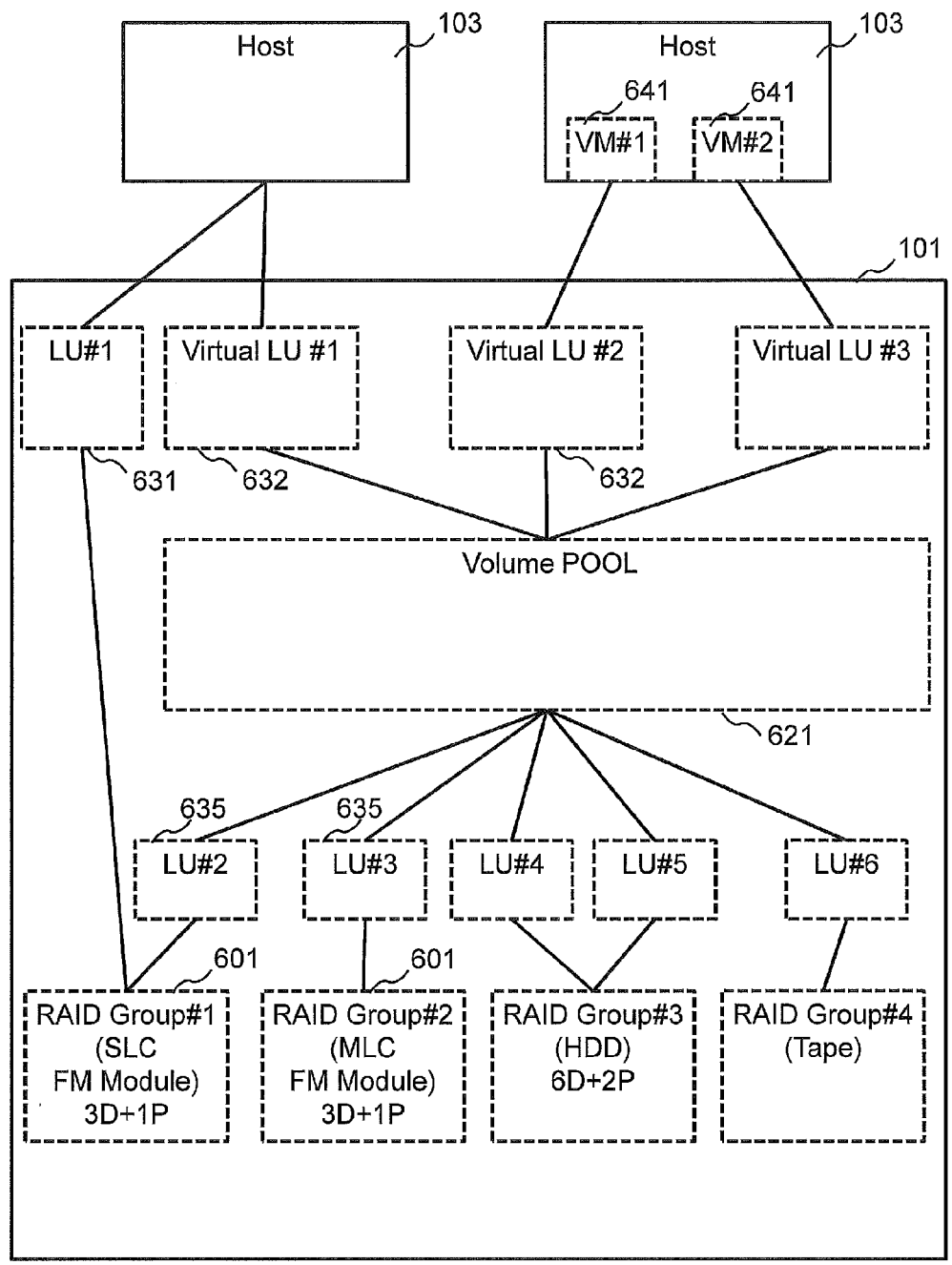
FIG. 6 is a view showing a logical device configuration of a storage system in accordance with an embodiment 1.

FIG. 6 is a schematic view showing a logical device configuration of the storage system 101.

The storage controller 121 provides a normal LU 631 and/or a virtual LU 632 as a logical storage device to the host 103 and/or a virtual machine (hereafter referred to as a VM) 641 that operates on the host 103. The host 103 and the VM 641 are not different from each other from a point of view of that both of the host 103 and the VM 641 recognizes a logical storage device (a normal LU 631 and/or a virtual LU 632) that is provided by the storage system 101. Consequently, the VM 641 is also hereafter referred to simply as a host 103. In the following descriptions, a normal LU that is provided to the host 103 is referred to as a "host LU" in some cases. The number of host LUs and the number of virtual LUs are not restricted to the number shown in the figure.

The host 103 recognizes a host LU 631 and/or a virtual LU 632 (although it is not necessary that the host 103 judges that a recognized LU is a normal LU or a virtual LU). In the case in which the host 103 refers to a host LU 631 and/or a virtual LU 632, the host 103 transmits a read request that specifies an LU number (LUN) and an LBA of the host LU 631 or the virtual LU 632 to the storage system 101.

The normal LU is a logical device based on the RAID Group 601. In the example shown in FIG. 6, an LU #1 of the normal LUs #1 to #6 is provided to the host 103.

On the other hand, a pool 621 is configured by a plurality of pool LUs 635 (LUs #2 to #6). Each of the pool LUs 631 is a kind of a normal LU and is divided into a plurality of virtual pages. In the case in which the plurality of virtual pages are allocated to a virtual LU 632, one or a plurality of virtual pages of the pool LU 635 are provided to the host 103 in an indirect manner.

The virtual LU 632 is an LU that is recognized by the host 103 and a virtual logical device that conforms to Thin Provisioning. A virtual page is allocated to a storage region of the virtual LU 632 (an LU region). In the present embodiment, a minimum unit of a storage region that is allocated to the virtual LU 632 is a virtual page. However, a minimum unit of a storage region is not restricted to a virtual page.

The virtual LU 632 is managed by the Thin Provisioning function of the storage system 101. The Thin Provisioning function is one of storage virtualization techniques and is a function for allocating a storage capacity on a request from the host 103. The function will be described in detail. For instance, the storage controller 121 provides a storage region of 10 TB as a virtual LU 632 to the host 103. Moreover, the host 103 utilizes a storage region of 1 TB of a virtual LU 632. In this case, the storage controller 121 corresponds a virtual page group of 1 TB of a virtual page group of 10 TB of the pool 621 is corresponded to the virtual LU 632. In the case in which the host 103 utilizes a storage region exceeds 1 TB, the storage controller 121 newly allocates a free virtual page (a virtual page in an allocatable state) to the virtual LU 632.

The configuration of the RAID Group 601 of FIG. 6 will be described in the following.

The RAID Group #1 is a RAID Group that is configured only by a plurality of FM modules on which an SLC is mounted. The RAID Group #1 is a configuration in which one parity is added to three data (hereafter referred to as RAID5 3D+1P).

The RAID Group #2 is a RAID Group that is configured only by a plurality of FM modules on which an MLC is mounted. The RAID Group #2 is a configuration of RAID5 3D+1P. The RAID Group #3 is a RAID Group that is configured only by an HDD.

The RAID Group #3 is a configuration in which two parities are added to six data (hereafter referred to as RAID6 6D+2P). The RAID Group #3 is configured by eight HDDs.

The RAID Group #4 is a RAID Group that is configured only by a Tape Drive. The RAID Group #4 is a configuration of RAID6 6D+2P.

Each of the RAID Groups is not restricted to the above configuration. For instance, the configuration of each of the RAID Groups can also be any configuration such as a configuration in which one parity is added to seven data (hereafter referred to as RAID5 7D+1P) in addition to the above configuration.

For the RAID Group 601, a bit cost, a write cost, and a performance are different depending on a RAID configuration and/or a type of a device that configures RAID. As described above, a bit cost is a cost that is required for continuing to hold data per bit. A write cost is a cost that is required for updating data per unit capacity (per 1 GB for instance). A performance is an I/O performance in a quintessential way, and is a response time (a time length from receiving a request to returning a response) as a concrete example.

In the example shown in the figure, the bits costs are RAID Group #4, RAID Group #3, RAID Group #2, and RAID Group #1 in ascending order. The write costs are RAID Group #4, RAID Group #3, RAID Group #1, and RAID Group #2 in ascending order. The performances are RAID Group #4, RAID Group #3, RAID Group #2, and RAID Group #1 in ascending order.

The storage controller 121 recognizes at least one difference of a bit cost, a write cost, and a performance, and modifies the RAID Group 601 that is allocated to the virtual LU 632. This modification is carried out by inputting a policy from the management apparatus 104 or the host 103 by a user for instance. The policy can be an operation rule in which "the RAID Group #1 is allocated to a virtual LU that is provided with a high performance on a priority basis" or "the RAID Group #3 and/or the RAID Group #4 that are provided with a low bit cost and/or a low write cost are allocated to a virtual LU that is provided with a low operation cost" and/or can be an operation rule in which "the RAID Group #1 is allocated to a region that is provided with a high read frequency in each virtual LU on a priority basis and the RAID Group #3 is allocated to a region that is provided with a low read frequency". By this configuration, the storage controller 121 can modify a correspondence between a virtual LU and the RAID Group automatically and dynamically. In the following descriptions, the modification of a correspondence between a virtual LU 632 and a RAID Group 601 is carried out by modifying a correspondence between a virtual LU and a virtual page. This correspondence is carried out on a regular basis at a period of time (for instance, at a period of 60 minutes). Hereafter a period of carrying out the modification of a correspondence between a virtual LU and a virtual page is referred to as a "virtual page corresponding modification period". This period can be fixed or can be varied. A "region that is provided with a high read frequency" is a region in which a read frequency is higher than a first frequency threshold value, and a "region that is provided with a low read frequency" is a region in which a read frequency is equal to or less than a second frequency threshold value. The first frequency threshold value is equal to or larger than the second frequency threshold value. At least one of the first frequency threshold value and the second frequency threshold value can be a constant number or a variable number. For instance, at least one of the first frequency threshold value and the second frequency threshold value can be a predetermined value or a value that is calculated on a timely basis from a statistics of a read frequency of a plurality of regions of at least one virtual LU (for instance, an average value of a read frequency of a plurality of regions).

Figure 7:
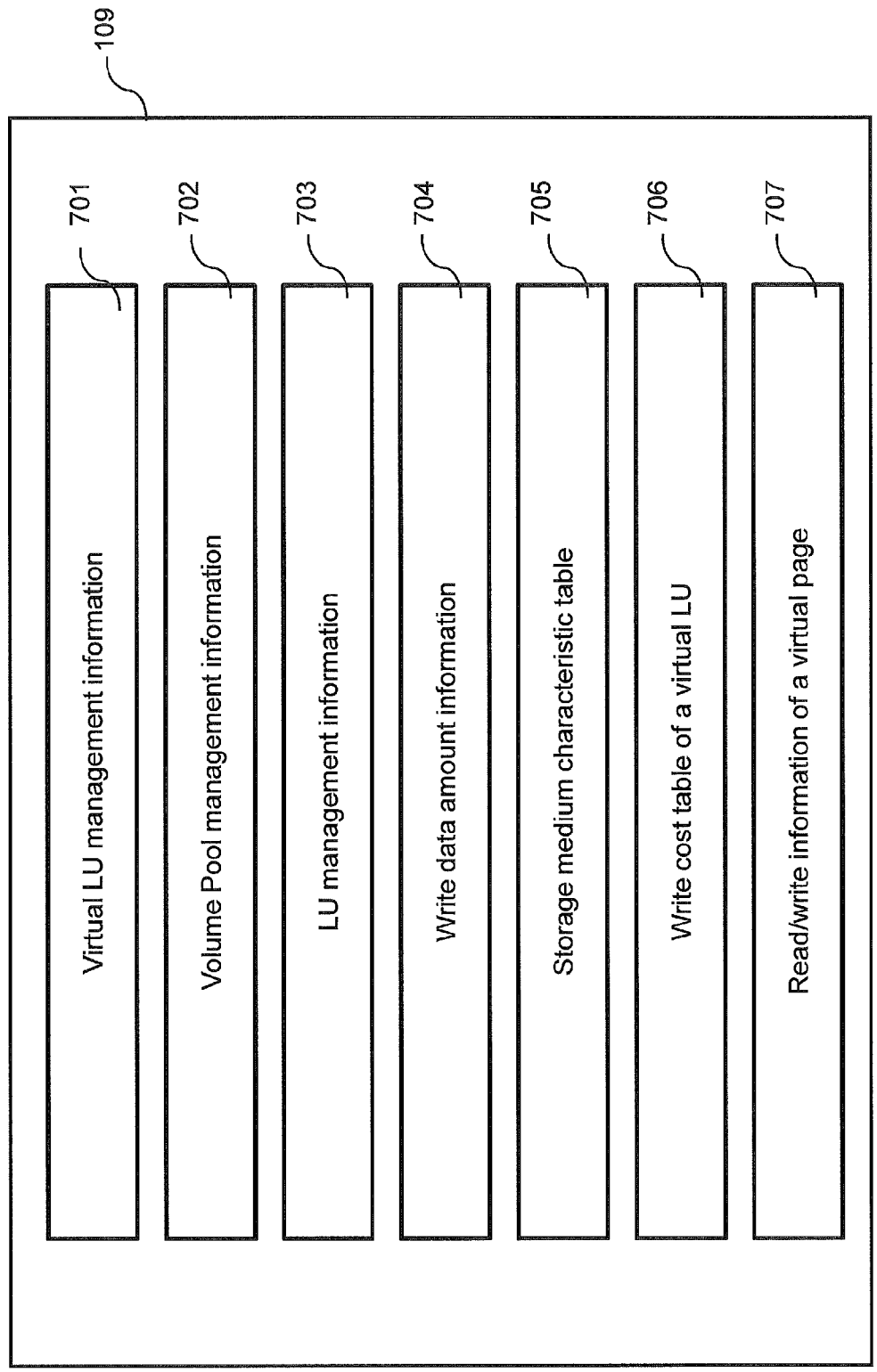
FIG. 7 is a view showing a variety of information that is stored into a memory of a storage controller in accordance with an embodiment 1.

FIG. 7 is a view showing a variety of information that is stored into a memory 109 of the storage controller 121.

The memory 109 stores a wide variety of information. More specifically, the information that is stored in the memory 109 is the virtual LU management information 701, the Volume Pool management information 702, the LU management information 703, the write data amount information 704, a storage device characteristic table 705, a write cost table 706 of a virtual LU, and the read/write information 707 of a virtual page. At least one of the above information can be prepared after an operation of the storage system 101. The information in the memory 109 will be described in the following. The information 701 to 707 can be equivalent to each other or can be different from each other between controllers 121. For instance, in the case in which any one of the information 701 to 707 is updated by any one of the controllers 121, the information after the update can be reflected to the information of the same type of other controller 121 by a communication of the controller 121 in which the information has been updated with all other controllers 121. Moreover for instance, in the case in which a virtual LU and a pool in charge are different from each other for every controller 121, at least one type of the information 701 to 707 is different from each other between the controllers 121.

Figure 8:
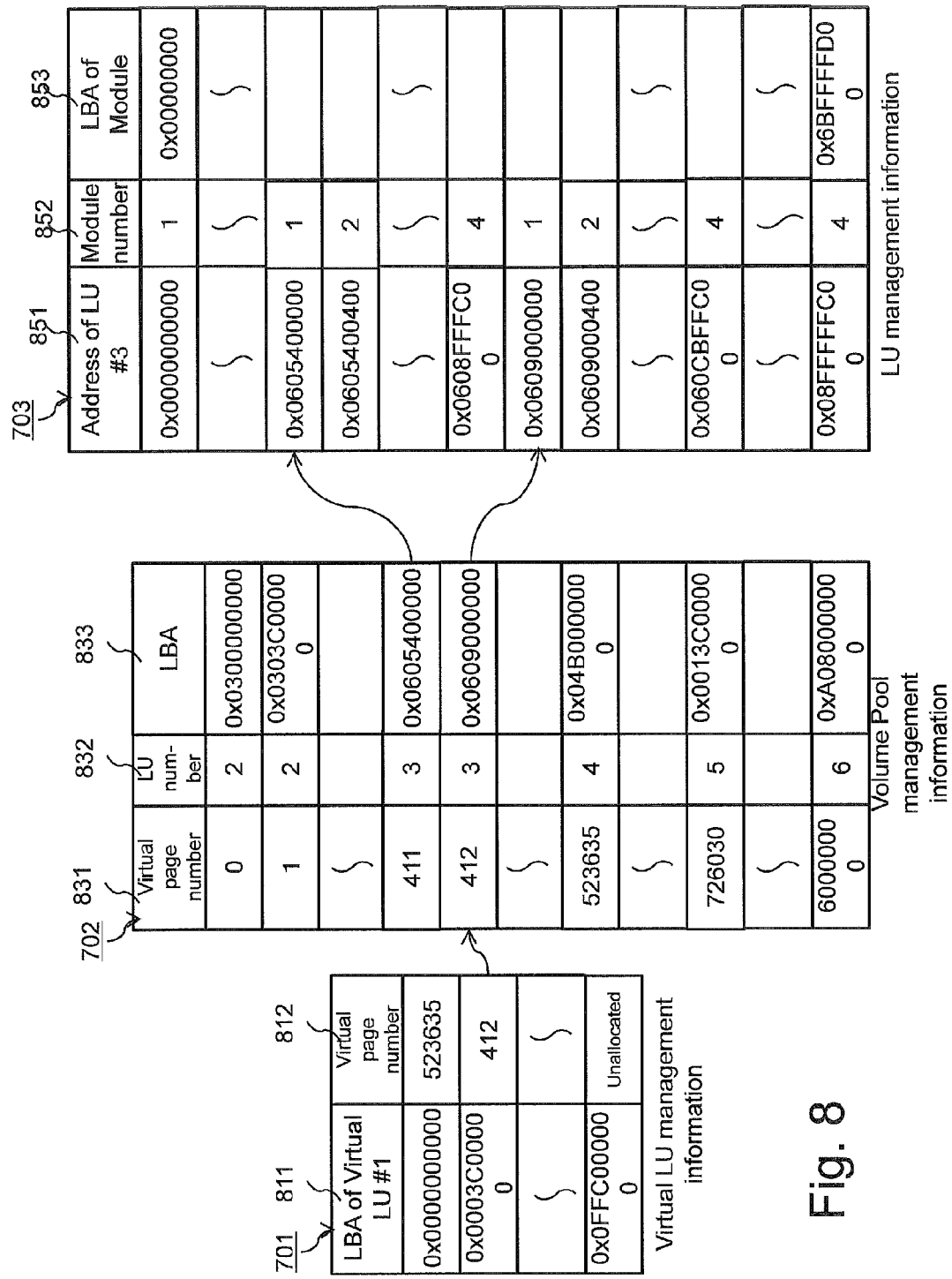
FIG. 8 is a view showing the virtual LU management information, the Volume Pool management information, and the LU management information in accordance with an embodiment 1.

FIG. 8 is a view showing the virtual LU management information 701, the Volume Pool management information 702, and the LU management information 703. In the figure, the virtual LU management information 701 is shown on the left side, the Volume Pool management information 702 is shown in the center, and the LU management information 703 is shown on the right side. The virtual LU management information 701 will be described in the first place.

<Virtual LU Management Information 701>

The virtual LU management information 701 is managed for every virtual LU. The virtual LU management information 701 is a table in which an LBA (hereafter referred to as a virtual LBA in some cases) 811 of a virtual LU that is corresponded to the information 701 ("target virtual LU" in the description of FIG. 8) is corresponded to a virtual page number 812 that is allocated to the LBA. For the explanation, FIG. 8 shows only the virtual LU management information 701 of a target virtual LU #1 (see FIG. 6). However, a configuration of the virtual LU management information of other virtual LU is equivalent to that of the target virtual LU #1.

The virtual LU management information 701 is configured by an LBA column 811 and a virtual page number column 812.

The LBA column 811 is a field for storing a leading LBA of a virtual LBA region of the virtual LU #1. Here the virtual LBA region is a region in which a storage region of a virtual LU (a normal LU in some cases in the following descriptions) is divided into a virtual page size. In other words, the virtual LBA region is a region that is continuous for a size of a virtual page. In the example shown in FIG. 7, a size of a virtual page is 60 MB. However, the present invention is not restricted to this size.

The virtual page number column 812 is a field for storing a number of a virtual page that has been allocated to the virtual LBA region. In the case in which there is not a page that has been allocated to the specific virtual LBA region, a value that indicates that there is not a page that has been allocated ("unallocated" in the example shown in the figure) is stored.

In the example shown in the figure, a virtual LBA "0x0003C00000" of the virtual LU #1 is corresponded to a virtual page number "412". For a virtual LBA "0x00FFC00000" of the virtual LU #1, a virtual page number is "unallocated".

<Volume Pool Management Information 702>

The Volume Pool management information 702 will be described in the next place.

The Volume Pool management information 702 is a table for managing a pool 621. In the example shown in the figure, one pool 621 is managed by the storage system 101. However, the number of pools that are managed by the storage system 101 is not restricted to one, and a plurality of pools can also be managed. In this case, the Volume Pool management information 702 is managed by a time of the number of pools.

The Volume Pool management information 702 is configured by a virtual page number column 831, an LU number column 832, and an LBA column 833.

The virtual page number column 831 is provided with fields of the number that is obtained by dividing the total storage region that configures the pool 621 by a virtual page size, that is, fields of the number of virtual pages. The number of all virtual pages that configure one pool 621 is registered.

The LU number column 832 is a field for storing the number of the pool LU 635 based on each virtual page.

The LBA column 833 is a field for storing a leading LBA of an LBA region of the pool LU 635 based on each virtual page. Hereafter an LBA of a pool LU (a normal LU) is referred to as an "LU LBA" and an LBA region of a pool LU (a normal LU) is referred to as an "LU LBA region" in some cases.

In the example shown in the figure, a virtual page number "411" is corresponded to an LU LBA "0x0605400000" of the LU number "3". Moreover, a virtual page number "412" is corresponded to an LU LBA "0x0609000000" of the LU number "3".

<LU Management Information 703>

The LU management information 703 will be described in the next place.

The LU management information 703 is a table that is managed for every normal LU shown in FIG. 6. For an explanation, only management information of an LU #3 is shown as the LU management information 703. However, a configuration of the management information of other normal LU is equivalent to that of the management information of the LU #3.

The LU management information 703 is configured by an address column 851 of an LU #3, a Module number 852, and an LBA column 853 of Module.

The address column 851 of LU #3 is a field for storing a leading LBA of each sub region that configures an LU LBA region of the LU #3. A size of a sub LU LBA region is decided by a configuration of the RAID Groups 601 to 604 based on a pool LU. For instance, a parity that is corresponded to a RAID level of a RAID Group that is a basis of the pool LU is added to the data in the LU LBA region of the pool LU, and a set of data and a parity is written to a plurality of FM modules (four modules in the example shown in the figure) that configure the RAID Group. Consequently, a size of the sub LU LBA region is a size that is obtained by dividing a data size in which the parity has been added to a data size of the LU LBA region by the number of FM modules that configure the RAID Group.

In the example shown in the figure, a parity is added to the data in which an LBA "0x0605400000" of the LU #3 is a leading LBA and an LU LBA region is a write destination, and the set of data and a parity is stored into the Module numbers "1" to "4". More specifically, for this data, a data element in which a sub LU LBA region of an LBA "0x0605400000" of the LU #3 is a write destination is stored into the FM module 110 of the Module number "1", a data element in which a sub LU LBA region of an LBA "0x0605400400" of the LU #3 is a write destination is stored into the FM module 110 of the Module number "2", and a data element in which a sub LU LBA region of an LBA "0x0608FFC00" of the LU #3 is a write destination is stored into the FM module 110 of the Module number "4".

In the example of FIG. 8, a size of a sub LU LBA region is 8 KB. However, a size of a sub LU LBA region is not restricted to 8 KB.

The Module number 852 is a field for storing a number of a storage device that is a basis of a sub LU LBA region of the LU #3. In other words, in the case in which a storage device that is a basis of a sub LU LBA region is an HDD, a number of the HDD is stored into the Module number column 852. In the case in which a storage device that is a basis of a sub LU LBA region is a Tape, a number of the Tape is stored into the Module number column 852. In the case in which a storage device that is a basis of a sub LU LBA region is an SLC FM Module, a number of the SLC FM Module is stored into the Module number column 852. In the case in which a storage device that is a basis of a sub LU LBA region is an MLC FM Module, a number of the MLC FM Module is stored into the Module number column 852.

The LBA column 853 of Module is a field for storing a leading LBA of a logical sub region that is a basis of a sub LU LBA region of the LU #3. A logical storage region of a storage device (for instance, an FM module) is divided into a plurality of logical sub regions. Hereafter an LBA to which a logical sub region of a storage device belongs is referred to as a Module LBA, and a logical sub region of a storage device is referred to as a Module LBA region in some cases. A size of the Module LBA region is equivalent to a size of the sub LU LBA region of the LU described above. Here a correspondence between an LBA of the sub LU LBA region and the Module LBA is managed by using the LU management information 703. However, in the case in which a calculation with an operation is enabled, it is not always necessary to use the LU management information 703. It is necessary that an LBA of each of pool LUs 611 to 615 and an LBA of each of the storage devices are uniquely corresponded to each other.

FIG. 9 is a view showing the write data amount information 704.

The write data amount information 704 is configured by a virtual LU number column 901, a total write amount column 902, the write amount columns 903, 905, 907, and 909 of a normal LU, and the real write amount columns 904, and 906 of a normal LU. The write data amount information 704 is updated for every "virtual page corresponding modification period" that has been described above (for instance, the write data amount information 704 is returned to be an initial value).

The virtual LU number column 901 is a field for storing a number of the virtual LU 632.

The total write amount column 902 is a field for storing a total write amount of each of the virtual LUs 632 that are indicated in the virtual LU number column 901. A value of the total write amount column 902 of each of the virtual LUs 632 is a total value of a write data amount of each of the pool LUs 635, that is, a total value of values that have been stored into the write amount columns 903, 905, 907, and 909 of a normal LU (a write data amount).

The write amount columns 903, 905, 907, and 909 of a pool LU are a field for storing a total write amount of each of the pool LUs 635 of each of the virtual LUs 632 that have been specified in the virtual LU number column 901. Here a write data amount of the pool LU 635 is the total of write data amounts that are summed for every virtual LU 632 and that have been transmitted from the storage controllers 121 to 123 to the pool LU 635. The value of the write amount columns 903, 905, 907, and 909 of a pool LU is a value that is obtained by referring to the read/write data amount information 707 of a virtual page and summing a value of the write data amount column 1204 of a pool LU for every virtual LU (see FIG. 12).

In FIG. 6, the pool LUs that may be corresponded to the virtual LU 632 are five LUs of an LU #2, an LU #3, an LU #4, an LU #5, and an LU #6. Consequently, the write data amount information 704 that is shown in FIG. 9 shows five write amount columns (903, 905, 907, 908, and 909) of LUs #2 to #6. However, the present invention is not restricted to this configuration. In the case in which there are eight normal LUs that may be corresponded to the virtual LU for instance, the number of the write amount columns of a pool LU is eight.

The real write amount column of a pool LU (for instance, a real write amount column 904 of an LU #2 and a real write amount column 906 of an LU #3) is a field for storing a real write amount to a plurality of FM chips 220 that are basis of the pool LUs #2 and #3 for every virtual LU 632. Here a real write amount to a plurality of FM chips is a data amount that is summed for the virtual LU 632 and is a data amount that has been actually written to a plurality of FM chips. In FIG. 6, the pool LUs 635 based on the RAID Group that is configured by a plurality of FM modules 110 are only an LU #2 and an LU #3. Consequently, the write data amount management information is provided with the real write amount columns 904 and 906 for only the LU #2 and the LU #3 of the LUs #2 to #6. The value of the real write amount columns 904 and 906 is a value that is obtained by referring to the read/write data amount information 707 of a virtual page and summing a value of the real write data amount column 1205 that is corresponded to each of the virtual LUs (see FIG. 12). FIG. 9 shows the real write amount columns 904 and 906 for only pool LUs #2 and #3 that are configured by the FM module 110. However, the real write amount column is not restricted to a pool LU based on the FM module 110. Providing an amount of write data that has been transmitted from the storage controller 121 to a normal LU and an amount of data that is written as a practical matter are different from each other, a storage device of this type can provided with a real write amount column.

FIG. 10 is a view showing a storage device characteristic table 705.

The storage device characteristic table 705 is configured by an LU number column 1001, a storage device column 1002, a bit cost column 1003, a write cost column 1004, a write IOPS column 1005, and a read IOPS column 1006.

The LU number column 1001 is a field for storing an LU number of a normal LU. In the example shown in the figure, the LU number column 1001 stores the LU numbers of the LUs #1 to #6.

The storage device column 1002 is a field for storing a type of a storage device. The storage device column 1002 stores a type of a storage device such as an SLC (FM module), an MLC (FM module), an HDD, and a Tape. However, the present invention is not restricted to these types of storage devices. In the case in which a storage device that utilizes a DRAM (Dynamic Random Access Memory), an MRAM (Magnetoresistive Random Access Memory), a ReRAM (Resistance Random Access Memory), or a PRAM (Phase Change Random Access Memory as a semiconductor storage medium is used for instance, a type of the storage device can also be stored into the storage device column 1002.

The bit cost column 1003 is a field for storing a bit cost for every normal LU. A bit cost that is stored into this column is calculated by a bit cost of the storage device and a bit cost of the RAID configuration. For instance, in the case in which a case of an SLC and a case of an MLC are compared with each other, a storage density of the SLC is lower than that of the MLC, whereby a bit cost of the SLC is higher than that of the MLC. The bits costs of the storage devices of the same type are different from each other depending on the RAID configuration. For instance, a bit cost of a normal LU that is configured by RAID5 3D+1P (one parity to three data) is higher than that of a normal LU that is configured by RAID5 7D+1P (one parity to seven data) (since a rate of a parity to data is varied). A value of a bit cost that is stored into the bit cost column 1003 is calculated by the configurations of a storage device and the RAID group when a user creates a normal LU.

The write cost column 1004 is a field for storing a write cost for every normal LU. A write cost that is stored into this column is calculated by a type of a storage device. Since an endurance erasing number of times (an upper limit of an erasing number of times of a physical block) of an MLC is less than that of an SLC in general for instance, a write cost of the MLC is higher than that of the SLC. A value of the write cost column 1004 is calculated based on a value of a write cost depending on a type of a storage device in the case in which a user creates a normal LU. For instance, a total writing enabled capacity of an MLC in which the erasing of 3000 times is permitted by a capacity of 1 GB is 3000 GB (1 GB*3000 times). In the case in which a price of the MLC is 100 $, a write cost of the MLC is 0.33 $/GB that is obtained by dividing a price 100 $ by a total writing enabled capacity 3000 GB. In the case of the MLC, 0.33 $ is spent for a data write of 1 GB. A write cost calculation method is not restricted to this method.

A normal LU that is based on a storage device in which an erasing number of times is not limited is provided with no write cost or an extremely small write cost. In the present embodiment, a normal LU that is based on a storage device in which an erasing number of times is not limited is provided with no write cost (a write cost is 0).

The write IOPS column 1005 is a field for storing an expected value of a write IOPS of each LU that is described in the LU number column 1001. A value of the write IOPS column 1005 is calculated by a storage device and the RAID configuration. For instance, a value of the write IOPS of an SLC is higher than that of an MLC in general. Even for a normal LU that is configured by a storage device of the same type, the write IOPS of a normal LU that is configured by RAID5 3D+1P (one parity to three data) is lower than that of a normal LU that is configured by RAID5 7D+1P (one parity to seven data) in some cases. A value of the write IOPS column 1005 is calculated by a write IOPS of a storage device and a write IOPS of the RAID group configuration when a user creates a normal LU.

The read IOPS column 1006 is a field for storing an expected value of a write IOPS of each LU that is described in the LU number column 1001. A value of the read IOPS column 1006 is calculated by a read IOPS of a storage device and the RAID configuration. For instance, a value of the write IOPS of an SLC is higher than that of an MLC in general. Even for a normal LU that is configured by a storage device of the same type, the write IOPS of a normal LU that is configured by RAID5 3D+1P (one parity to three data) is lower than that of a normal LU that is configured by RAID5 7D+1P (one parity to seven data) in some cases. A value of the read IOPS column 1006 is calculated by a read IOPS of a storage device and a read IOPS of the RAID group configuration when a user creates a normal LU.

A value of the write IOPS column 1005 and a value of the read IOPS column 1006 are used for selecting a modified destination in the case in which a storage device is modified corresponding to the read IOPS or the write IOPS of data to a normal LU. In the case in which a read performance of a virtual LU is improved for instance, data of a higher read IOPS is moved to a virtual page of a normal LU of a larger read IOPS.

FIG. 11 is a view showing a write cost table 706 of a virtual LU.

The write cost table 706 of a virtual LU is configured by a virtual LU number column 1101, a priority setting column 1102, an expected write cost column 1103, a measured write cost column 1104, and a predicted write cost column 1105. The write cost table 706 of a virtual LU is updated for every "virtual page corresponding modification period" described above (for instance, the write cost table 706 of a virtual LU is returned to be an initial value).

The virtual LU number column 1101 is a field for storing a virtual LU number of the virtual LU 632.

The priority setting column 1102 is a field for storing a priority setting of a virtual LU 632. The priority setting is a priority that is a modification standard in the case in which a stored destination of data is modified. A priority setting is provided with a write cost, a bit cost, and a performance for instance.

In the case in which a priority setting is set as a write cost and a measured write cost of the virtual LU is higher than an expected write cost, a virtual page that is corresponded to the virtual LU is modified in such a manner that data is stored into a storage device that is provided with a small write cost.

In the case in which a priority setting is set as a bit cost, a write cost of the virtual LU is not considered. In this case, a virtual page that is corresponded to the virtual LU is modified in such a manner that data in which the read/real write data amount is equal to or larger than a certain threshold value is allocated to a storage device that is provided with a high bit cost for the virtual LU and that data in which the read/real write data amount is less than a certain threshold value is allocated to a storage device that is provided with a low bit cost.

In the case in which a priority setting is set as a performance, a virtual page that is corresponded to the virtual LU is modified in such a manner that a threshold value of the read/real write data amount is set to be lower as compared with the case in which a priority setting is set as a bit cost and that data in which the read/real write data amount is not so high is allocated to a storage device that is provided with a high bit cost. A bit cost and a performance of the priority setting that has been described above are equivalent to an operation in the case in which a storage device of a general hierarchical storage system is modified. Consequently, in the present embodiment, only a control of a virtual LU in which a priority setting is set as a write cost will be described later. Moreover, in the present embodiment, a user can modify a priority setting of each of the virtual LU 632 from the management apparatus 104 or the host 103 to the storage system 101 for instance.

The expected write cost column 1103 is a field for storing an expected value of a write cost of a virtual LU 632. The expected value of a write cost (hereafter simply referred to as an expected value in some cases) is stored into the expected write cost column 1103 in the "virtual page corresponding modification period" described above. A user can set or modify an expected value from the management apparatus 104 and/or the host 103. The setting and/or modification of an expected value are for an expected value to the "virtual page corresponding modification period" or an expected value of a predetermined period of time (for instance, 5 years) for instance. In the case in which an expected value of a predetermined period of time is set, an expected value to the "virtual page corresponding modification period" is calculated and stored into the expected write cost column 1103. Moreover, a value of the expected write cost column 1103 can also be set by a producer before a shipment of the storage system 101 from a factory in accordance with a desire of a user.

The measured write cost column 1104 is a field for storing a value of a write cost that is measured for every virtual LU 632 (hereafter referred to as a measured write cost). The measured write cost is measured in the "virtual page corresponding modification period" described above. More specifically, the measured write cost is a product of the read write data amounts 904 and 906 of each pool LU (see FIG. 9) and a write cost 1001 of a pool LU (see FIG. 10).

The predicted write cost column 1105 is a field for storing a predicted value of a write cost for every virtual LU 632 (hereafter simply referred to as a predicted value). The predicted value is calculated in the "virtual page corresponding modification period" described above and is stored into the predicted write cost column 1105. For the virtual LU 632 in which the priority setting column 1102 is set as a write cost, a virtual page that is corresponded to the virtual LU is modified until a predicted value falls below an expected value for a write cost inspection flow that is described later.

FIG. 12 is a view showing the read/write information 707 of a virtual page.

The read/write information 707 of a virtual page is configured by an LU number column 1201, a virtual page number column 1202, a read amount column 1203, a write data amount column 1204, a real write data amount column 1205, the read/real write data amount columns 1206, and a virtual LU number column 1207. The storage controller 121 updates the read/write information 707 of a virtual page for every "virtual page corresponding modification period".

The LU number column 1201 is a field for storing a number of a normal LU that is corresponded to each virtual page.

The virtual page number column 1202 is a field for storing a number of a virtual page that configures a pool 621. Consequently, the virtual page number column 1202 is provided with fields of the number that is obtained by dividing the total storage region of the pool 621 by a virtual page size, that is, the number of virtual pages.

The read amount column 1203 is a field for storing an amount of read data for every virtual page. More specifically, the storage controller 121 counts the number of times of a read for every virtual page in the "virtual page corresponding modification period" and stores a product of the number of times of a read and a size of a virtual page into the virtual page number column 1202. After the "virtual page corresponding modification period" is completed, the storage controller 121 resets the virtual page number column 1202 to "0". In the present embodiment, the "virtual page corresponding modification period" is common for all virtual pages. Consequently, a size of an amount of read data can be compared with each other between virtual pages.

The write data amount column 1204 is a field for storing an amount of write data for every virtual page. More specifically, the storage controller 121 counts the number of times of a write for every virtual page during the "virtual page corresponding modification period" and stores a product of the number of times of a write and a size of a virtual page into the write data amount column 1204. (In the case in which a remainder occurs when a size of write data is divided by a size of a virtual page, the write data can also be calculated by subtracting a data amount of a remainder from a product of the number of times of a write and a size of a virtual page.) After the "virtual page corresponding modification period" is completed, the storage controller 121 resets the write data amount column 1204 to "0". As described above, in the present embodiment, the "virtual page corresponding modification period" is common for all virtual pages. Consequently, an amount of write data can be compared with each other between virtual pages.

Figure 27:
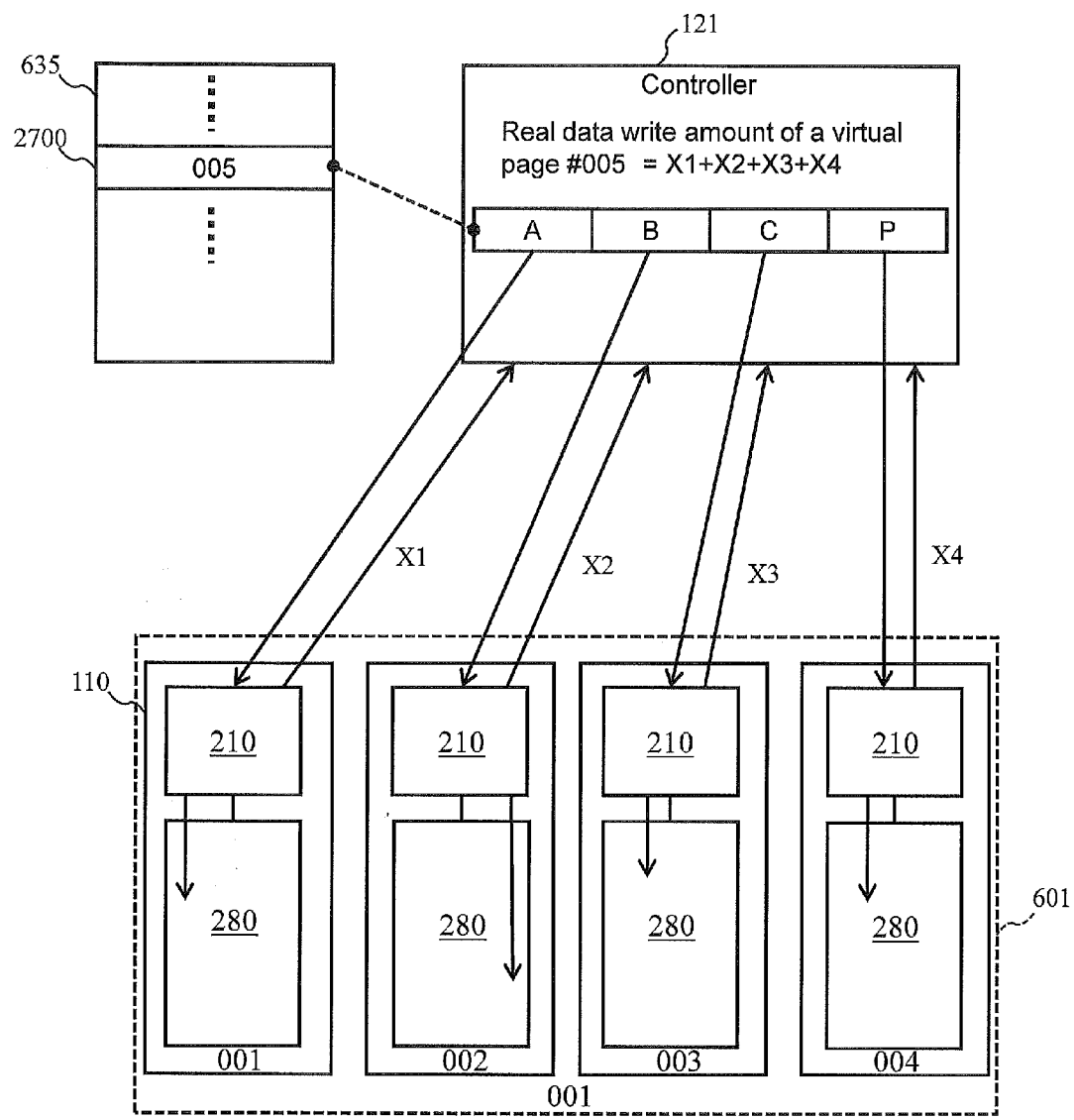
FIG. 27 is an explanation drawing of a calculating method of a write data amount and a real write data amount of a virtual page in accordance with an embodiment 1.

The real write data amount column 1205 is a field for storing a real write data amount for every virtual page. More specifically, the storage controller 121 stores a real write data amount of a virtual page into the real write data amount column 1205 during the "virtual page corresponding modification period". As shown in FIG. 27, each virtual page 2700 is based on a plurality of storage devices (FM modules 110) that configure the RAID Group 601. For instance in FIG. 27, a virtual page #005 is based on a plurality of FM modules #001 to #004 that configure the RAID Group #001 (3D+1P). A plurality of data units based on the data of a write target in which a virtual page #005 is a write destination, for instance, three data elements #A to #C of the same size and a parity #P based on the three data elements can be obtained. The data elements #A to #C and the parity #P are transmitted to the plurality of FM modules #001 to #004. Consequently, a size of write data at this time is the same for each of the FM modules #001 to #004. For each of the FM modules #001 to #004, the FM controller 210 writes the data element or the parity that has been received to at least one physical page of a flash memory (a medium that is configured by a plurality of FM chips) 280. The number of physical pages that are a write destination of the data element or the parity is "the number of times of a write". The FM controller 210 manages the number of times of a write for each Module LBA region and can update the number of times of a write at every write. Consequently, the FM controller 210 can a real data write amount that is a product of the number of times of a write and the Module LBA region for each Module LBA region. At a timing described later, the storage controller 121 receives the real write data amounts X1 to X4 for the Module LBA region that belongs to the virtual page #005 from each of the FM modules #001 to #004, and calculates the real write data amount of the virtual page #005 by summing the real write data amounts. In other words, in the present embodiment, the real write data amount of one virtual page is in the following: (Real write data amount of one virtual page)=(Sum of the number of a plurality of times of a write that is corresponded to a plurality of Module LBA regions based on the virtual page)×(Size of the Module LBA region (Size of a physical page)) As described above, the storage controller 121 receives a plurality of real write amounts that are corresponded to a plurality of Module LBA regions based on the virtual page (a product of the number of times of a write to the Module LBA region and a size of the Module LBA region) from a plurality of FM modules based on the virtual page for every virtual page, and sums the plurality of real write amounts, whereby the real write data amount of each virtual page can be calculated. Moreover, the storage controller 121 can receive the number of a plurality of times of a write that is corresponded to a plurality of Module LBA regions based on the virtual page from a plurality of FM modules based on the virtual page for every virtual page, sum the plurality of real write amounts, and multiply the calculated sum of the number of times of a write with a size of the Module LBA region, whereby the real write data amount of each virtual page can also be calculated. Moreover, the storage controller 121 can also receive a notification of an amount of data that has been actually written to the FM chip (for instance, an amount of data after a compression) from the FM module of a transmission destination of data, sum the data amount that has been notified of, add the sum value to a value of the real write data amount column 1205 that is corresponded to a virtual page of a write for instance.

The storage controller 121 resets the real write data amount column 1205 to "0" after the "virtual page correspondence period" is completed. More specifically, the storage controller 121 gives an instruction to notify the real write data amount for every virtual page to the FM module 110. The FM module 110 that has received the instruction refers to the virtual page write information 1303 described later and transmits the virtual page number 1601 and a value of the real write data amount 1603 of the virtual page to the storage controller 121. The storage controller 121 then stores the virtual page number that has been transmitted into the virtual page number column 1202 and adds the real write data amount of the virtual page (the sum of the real write amount that has been obtained from a plurality of FM modules for one virtual page) to a value of the real write data amount column 1205 that is corresponded to the virtual page. As described above, in the present embodiment, the "virtual page corresponding modification period" is common for all virtual pages. By this configuration, the real write data amount can be compared with each other between virtual pages. For a storage device in which a write data amount and a real write amount are not different from each other for instance, it is not necessary to acquire a real write data amount in some cases. In this case, a value equivalent to that of the write data amount column 1204 is stored into the real write data amount column 1205.

The read/real write data amount columns 1206 is a field for storing a total value of a read data amount and a real write data amount virtual page. More specifically, during the "virtual page corresponding modification period", the storage controller 121 counts the number of times of a read and the number of times of a write to a virtual page in this field and stores a product of the total value and a size of a virtual page into the read/real write data amount columns 1206. After the "virtual page corresponding modification period" is completed, the storage controller 121 resets the read/real write data amount columns 1206 to "0". In the present embodiment, the "virtual page corresponding modification period" is common for all virtual pages. By this configuration, a read/real write data amount can be compared with each other between virtual pages.

The virtual LU number column 1207 is a field for storing a virtual LU number of a virtual LU to which a virtual page that is indicated in the virtual page number column 1202 has been allocated.

Figure 13:
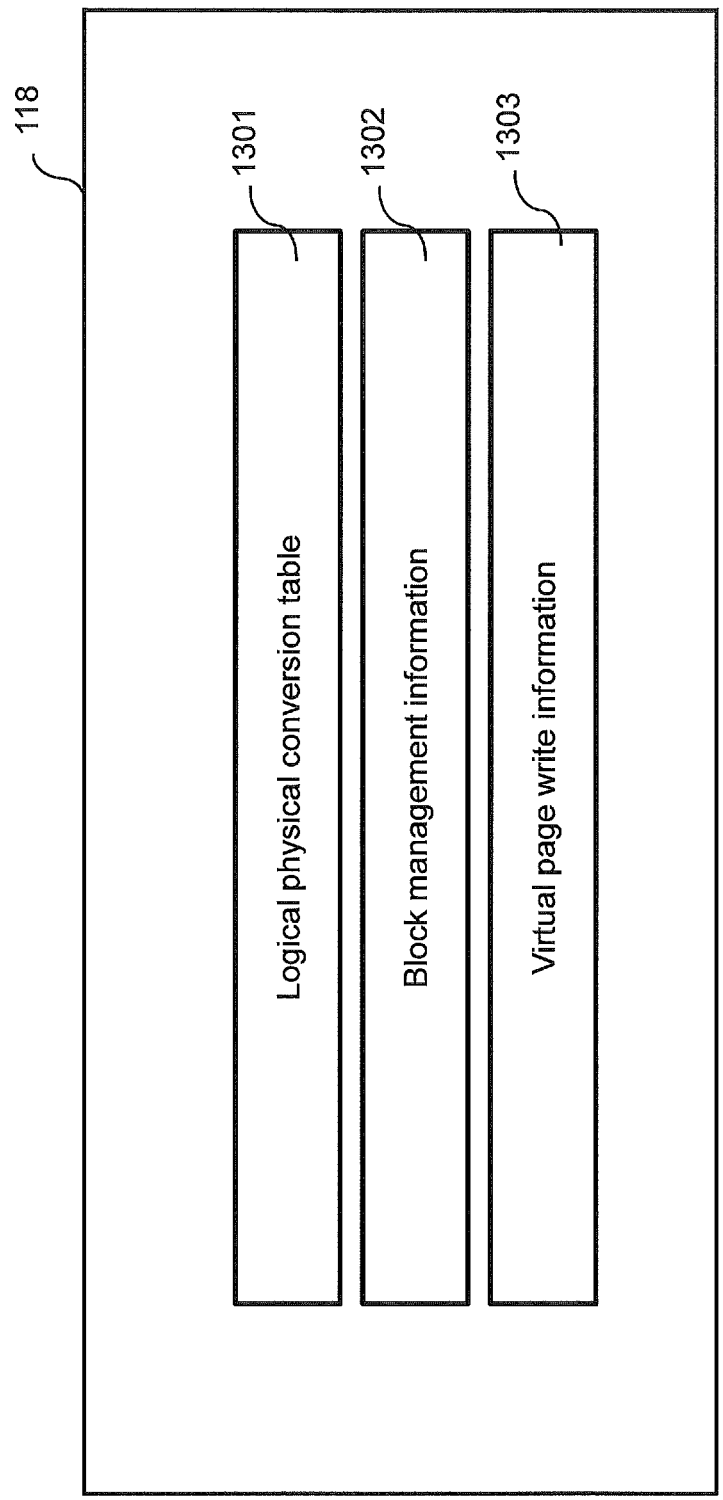
FIG. 13 is a view showing the management information that is stored into a RAM in accordance with an embodiment 1.

FIG. 13 is a view showing the management information 118 that is stored into a RAM 213.

The RAM 213 stores a wide variety of the management information 118. More specifically, the management information 118 that is stored into the RAM 213 is a logical physical conversion table 1301, the block management information 1302, and the virtual page write information 1303. At least one of the information can be prepared after an operation of the storage system 101. Each of the management information 118 will be described in the following.

FIG. 14 is a view showing a logical physical conversion table 1301.

The logical physical conversion table 1301 is configured by an LBA column 1401, a virtual page number column 1402, and a PBA column 1403.

The LBA column 1401 is a field for storing a leading address of a Module LBA region of the FM module 110. The Module LBA region is an LBA region that is released to an outside of the FM module 110 (that is, the storage controller 121). A size of the Module LBA region is equivalent to that of a physical page of the FM chip 220. Consequently, a size of the Module LBA region is equivalent to that of a sub LU LBA region of a normal LU described before. In the example shown in the figure, a size of the Module LBA region is 8 KB as one physical page size. However, a size of the Module LBA region is not restricted to this size. One physical page size can also be set to be a size other than 8 KB. A size of the Module LBA region can also be equivalent to a size of a plurality of physical pages or a size of a plurality of physical blocks.

The virtual page number column 1402 is a field for storing a number of a virtual page to which the Module LBA region of the FM module 110 belongs.

The PBA column 1403 is a field for storing a PBA of a physical page that has been allocated to the Module LBA region. An FM chip, a physical block, and a physical page of an access destination are identified by the PBA. In the case in which the FM module 110 receives data after an update (hereafter referred to as updated data) of data that has been stored into a physical page that has been allocated to a certain Module LBA region from the storage controller 121, the FM module 110 stores the updated data into a free physical page that is next to a trailing physical page of an used physical page group of a physical block in use. The FM module 110 then executes the corresponding a PBA of the free physical page as substitute for a PBA of a physical page in which data before an update has been stored to the certain Module LBA region. Consequently, the PBA column 1403 is updated. The "physical block in use" is a physical block in which data has been written to a leading physical page and a trailing physical page is free. The "used physical page" is a physical page in which data before an update (invalid data) has been stored or a physical page in which data after an update (valid data) has been stored.

FIG. 15 is a view showing the block management information 1302.

The block management information 1302 is configured by a PBA Group column 1501, an FM chip number column 1502, a block number column 1503, an accumulated erasing number of times column 1504, an accumulated erasing number of times sum column 1505, a remaining erasing number of times sum column 1506, and a degradation rate column 1507.

The PBA Group column 1501 is a field for storing a PBA of a leading physical page of a physical block that is an aggregate of a plurality of physical pages.

The FM chip number column 1502 is a field for storing a number of an FM chip that is provided with a physical block.

The block number column 1503 is a field for storing a block number of a physical block. In the case in which an FM chip and a physical block number can be calculated from a physical block, it is not necessary to dispose the FM chip number column 1502 and the block number column 1503.

The accumulated erasing number of times column 1504 is a field for storing an accumulated erasing number of times of a physical block. In the case in which data of a target physical block is erased, 1 is added to a value of the accumulated erasing number of times column 1504 of the physical block. It is not necessary that the FM module 110 can use a physical block in which an accumulated erasing number of times is equal to or larger than a threshold value as a physical block in which it is difficult to maintain a reliability.

The accumulated erasing number of times sum column 1505 is a field for storing a total sum of an accumulated erasing number of times of a physical block for every FM module 110. A value that is stored into the accumulated erasing number of times sum column 1505 is a total sum of values of the accumulated erasing number of times column 1504. In the case in which the erasing of a physical block that belongs to the target FM module 110 is carried out, 1 is added to a value of the accumulated erasing number of times sum column 1505.

The remaining erasing number of times sum column 1506 is a field for storing an erasing enable number of times of a physical block for every FM module 110. An erasing enable number of times of a physical block is a value that is obtained by subtracting a value of the accumulated erasing number of times sum column 1505 from an erasing enable sum number of times of a physical block (a product of the number of physical blocks that belong to the FM module 110 and an erasing number of times that is permitted for one physical block). In the case in which data of a physical block of the target FM module is erased, the FM module 110 subtracts 1 from a value of the remaining erasing number of times sum column 1506.

The degradation rate column 1507 is a field for storing a rate of the remaining erasing number of times to the accumulated erasing number of times sum. In other words, a value that is stored into the degradation rate column 1507 is a value that is obtained by indicating on percentage a value that is obtained by dividing a value of the accumulated erasing number of times sum column 1505 by a value of the remaining erasing number of times sum column 1506. In the case in which data of a physical block of the target FM module is erased, the FM module 110 recalculates a value of the degradation rate column 1507.

The storage controller 121 acquires the values of the accumulated erasing number of times sum column 1505, the remaining erasing number of times sum column 1506, and the degradation rate column 1507 from the FM module 110 and predicts a duration of life of the FM module 110 based on the values.

FIG. 16 is a view showing the virtual page write information 1303.

The virtual page write information 1303 is configured by a virtual page number column 1601, a write data amount column 1602, and a real write data amount column 1603.

The virtual page number column 1601 is a field for storing the number of a virtual page.

The write data amount column 1602 is a field for storing a write data amount for every virtual page. The FM module 110 receives the Module LBA of the FM module 110 and data of a write target from the storage controller 121 and specifies the number of a virtual page that is corresponded to the Module LBA based on the logical physical conversion table 1301. The FM module 110 then adds an amount of data that has been received to a value of the write data amount column 1602 that is corresponded to the specified virtual page.

The real write data amount column 1603 is a field for storing a real write data amount for every virtual page. The FM module 110 receives the Module LBA of the FM module 110 and data of a write target from the storage controller 121 and specifies a PBA of a physical page that is corresponded to the Module LBA and the number of a virtual page based on the logical physical conversion table 1301. The FM module 110 then stores data into the specified physical page and counts a number of times of a write. A product of a number of times of a write and a size of a physical page is a real write data amount. The FM module 110 calculates an amount of data that has been actually written when the data is written to the FM chip 220, and adds the amount of data that has been calculated to a value of the real write data amount column 1603 that is corresponded to the specified virtual page.

In the following cases, a write data amount and a real write data amount are different from each other in some cases. This is because the number of times of a write to the FM chips 220 to 228 is varied in some cases in accordance with the following processing:

Case in which data that has been received by the FM module 110 is compressed and written to the FM chip 220; and Case in which a reclamation processing described later or a refresh processing is carried out.

FIG. 17 is a view showing the virtual page update information.

In the case in which a new normal LU is added to the pool 621, or in the case in which a normal LU is removed from the pool 621, a correspondence between a virtual page and a storage device is modified. At this time, the storage controller 121 transmits the virtual page update information 1700 to a storage device in which it is necessary that a write data amount is measured (for instance, the FM module 110).

The virtual page update information 1700 is configured by a module LBA region column 1701 and a virtual page number column 1702. The virtual page update information 1700 is transmitted to update a Module LBA region of a storage device in which a correspondence with a virtual page is modified. In the case in which there is an FM module that has been added to the pool 621 for instance, the information 1700 that includes the Module LBA and a number of a virtual page to which the Module LBA region belong is transmitted to the FM module that has been added by the storage controller 121 for every Module LBA region of the FM module.

The module LBA region column 1701 is a field for storing an LBA of a Module LBA region.

The virtual page number column 1702 is a field for storing a number of a virtual page to which the Module LBA region belongs.

The FM module 110 that received the virtual page update information 1700 updates the logical physical conversion table 1301 (see FIG. 14) based on the virtual page update information 1700 that has been received. More specifically, the FM module 110 stores a leading LBA of the Module LBA region that has been specified by the information 1700 that has been received into the LBA column 1401, and a virtual page that has been specified by the information 1700 into the virtual page number column 1402.

Figure 18:
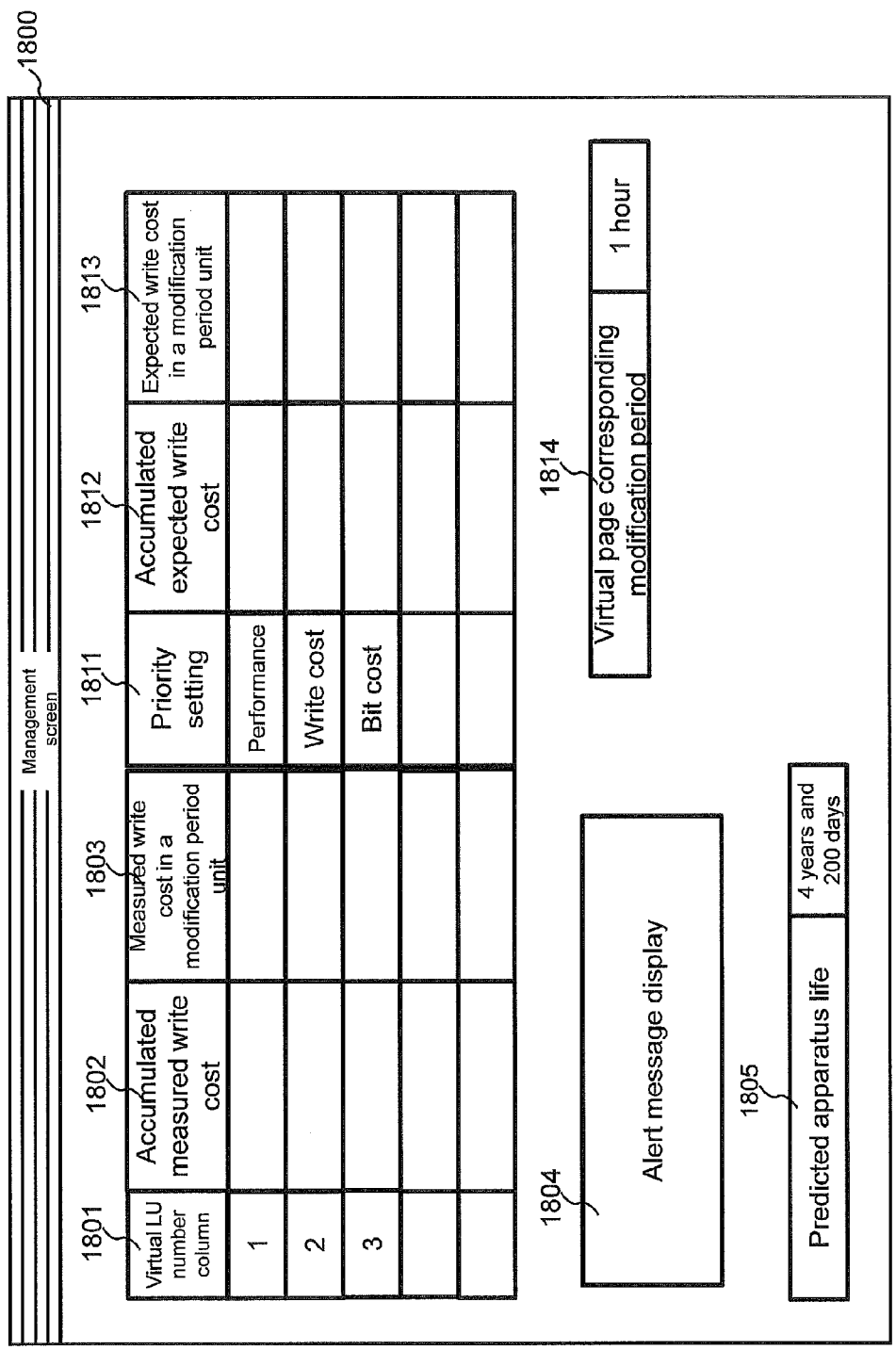
FIG. 18 is a view showing an example of a management screen of a storage system in accordance with an embodiment 1.

FIG. 18 is a view showing an example of a management screen of the storage system 101.

The storage system 101 can acquire a write data amount for every virtual LU 632 by the management apparatus 104 or the host 103. A user can modify a priority setting of each virtual LU 632 in accordance with the desired apparatus life duration (the life duration of the storage system 101 or a storage device) and a cost based on a write data amount for every virtual LU 632. Moreover, a user can comprehend an operation cost of a service in which the virtual LU 632 is used by recognizing a write cost of the virtual LU 632 via a management screen 104. An amount that is to be charged to a user that utilizes the virtual LU 632 (a usage fee of the virtual LU 632) can be calculated by using a real write data amount of the virtual LU 632.

A management screen 1800 is shown by a display apparatus of the management apparatus 104 or the host 103. The management screen 1800 is configured by the display items 1801 to 1805 that shows a wide variety of information and the input items 1811 to 1814 that are input by a user.

The display items 1801 to 1805 will be described in the following.

A virtual LU number column 1801 shows the numbers of all virtual LUs of the storage system 101.

An accumulated measured write cost column 1802 shows a total value of a real write cost amount for every virtual LU 632. This is a total value of the values of a measured write cost column 1803 in a unit of a virtual page corresponding modification period. In the case in which a virtual LU is utilized for three years for instance, a total value of a real write cost amount that has occurred for three years is shown in the accumulated measured write cost column 1802.

A measured write cost column 1803 in a unit of a virtual page corresponding modification period shows a real write cost column that has been measured in the latest virtual page corresponding modification period. More specifically, in the case in which a write cost table 706 of a virtual LU is updated, a value of a measured write cost column 1104 before the update is acquired and displayed.

An alert message display column 1804 shows a wide variety of alert messages that have occurred in the storage system 101. For instance, the alert message display column 1804 shows the number of an FM module that will come to the end of a life of the apparatus several days later and a virtual LU in which a measured write cost in a unit of a virtual page corresponding modification period is extremely high.

A predicted apparatus life column 1805 shows a predicted value of a period of time in which a storage device in the storage system 101 can be maintained. In the case in which the value is shorter than an apparatus life that is expected by a user, a user can recognize that it is necessary to reduce a write cost of a whole of or a part of virtual LUs 632. In this case, a user can expect to reduce a write amount of data to a storage device that is deteriorated and to extend a period of time in which a storage device in the current storage system 101 can be maintained by setting a priority setting column 1811 of more virtual LUs 632 to a "write cost" and by decreasing a value of an accumulated expected write cost column 1812 and a value of a modification period expected write cost column 1813.

By the above display items, a user can comprehend a write cost that has been consumed by each of the virtual LUs 632. In the present embodiment, a write cost of each of the virtual LUs 632 is displayed. However, a write cost of each of the storage devices can also be displayed. Moreover, not a write cost but a real write data amount can also be displayed.

The priority setting column 1811 is an item in which a priority setting of a virtual page corresponding modification of each of the virtual LUs 632 is input. For instance, a performance, a write cost, a bit cost are input to this item. An input to the priority setting column 1811 by a user enables a content of the priority setting column 1102 of the write cost table 706 to be updated.

The accumulated expected write cost column 1812 is an item in which an expected value of an accumulated write cost is input. In this item for instance, an upper limit of an accumulated write cost is set for each of the virtual LUs 632 by a user. In the case in which an accumulated measured write cost exceeds an accumulated expected write cost, an alarm is displayed on an alert message display screen 1804. The accumulated expected write cost column 1812 can also be input in the accumulated period of time. The accumulated expected write cost can also be calculated and set in such a manner that the accumulated expected write cost is automatically varied in consideration of a time variation. In the case in which a user inputs "a write cost for 5 years=$50000" into the accumulated expected write cost column for instance, an accumulated expected write cost for one year from a start of a usage is calculated to be $10000 by the storage controller 121. This value can be set as an upper limit of an accumulated expected write cost.

The expected write cost column in a modification period unit 1813 is an item in which an expected value of a write cost in the "virtual page corresponding modification period" is input. In the case in which a user inputs the expected write cost column in a modification period unit 1813, the storage controller 121 updates a value of the expected write cost column 1103 of the write cost table 706. A setting can also be carried out in such a manner that a value of the expected write cost column in a modification period unit 1813 can be decided by a set value of the accumulated expected write cost column 1812. In this case, a setting can also be carried out in such a manner that a value of the expected write cost column 1103 of the write cost table 706 is automatically decided. In the case in which a user inputs "a write cost for 5 years=$50000" into the accumulated expected write cost column 1812 for instance and the "virtual page corresponding modification period" is set to be 60 minutes, a value of the expected write cost column in a modification period unit 1813 can be controlled to be $1.14 ($50000/5 years/365 days/24 hours) by the storage controller 121. In this case, the expected write cost column in a modification period unit 1813 cannot input and a value is automatically set by the storage system 101.

The virtual page corresponding modification period column 2014 is an item in which the "virtual page corresponding modification period" of the storage system 101 is input. In the case in which the "virtual page corresponding modification period" is set to be shorter, a write cost can be managed in more detail.

An operation of the storage system 101 will be described in the following.

Figure 19:
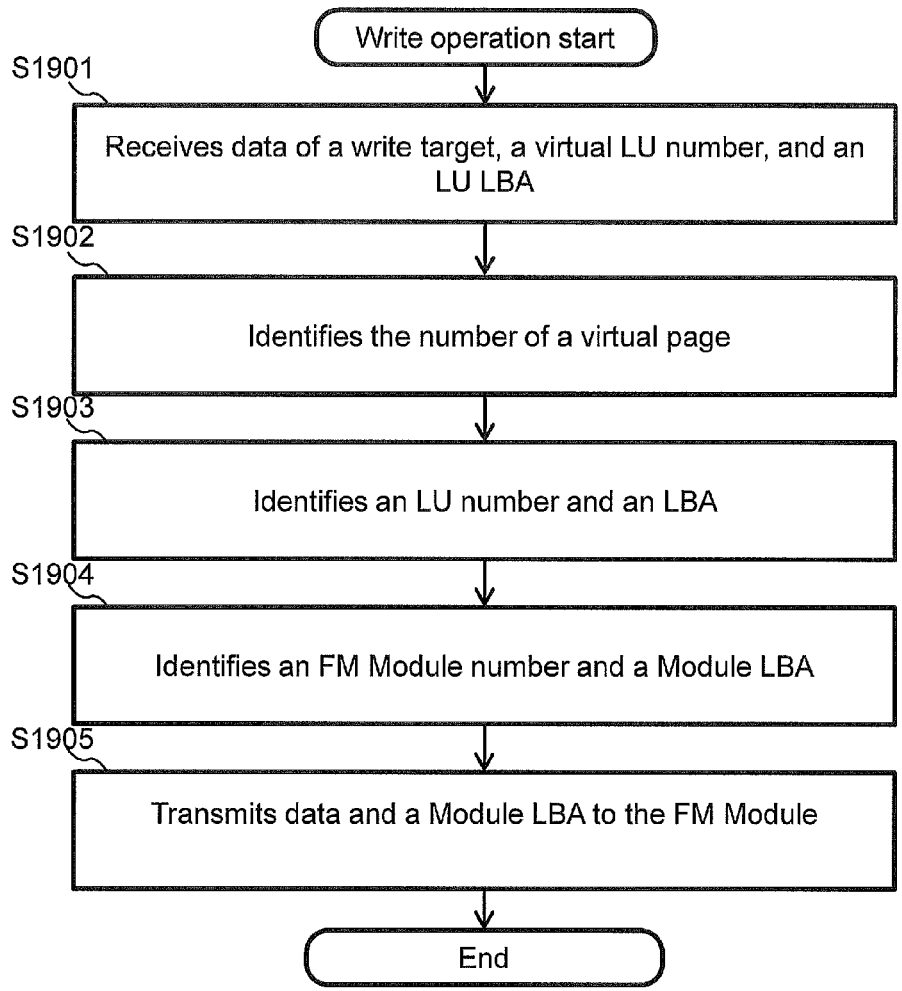
FIG. 19 is a view showing a flow of a write operation of a storage controller in accordance with an embodiment 1.

FIG. 19 is a view showing a flow of a write operation of the storage controller 121.

In the S1901, the storage controller 121 receives a write request and the data of a write target from the host 103. In the write request, a virtual LU number and a virtual LBA of a virtual LU are specified.

In the S1902, the storage controller 121 refers to the management information 701 that is corresponded to a virtual LU of the virtual LU number that has been received in the S1901, and identifies the number of a virtual page to which the virtual LBA that has been received in the S1901 belongs.

In the S1903, the storage controller 121 refers to the Volume Pool management information 702, and identifies an LU number and an LU LBA that are corresponded to the number of a virtual page that has been identified in the S1902.

In the S1904, the storage controller 121 refers to the LU management information 703, and identifies a plurality of Module numbers and a plurality of Module LBAs that are corresponded to the LU number and the LU LBA that have been identified in the S1903.

In the S1905, the storage controller 121 transmits a write request and a part of data of a write target that has been received in the S1901 (or a parity based on data of a write target depending on a RAID level) to a storage device of each Module number that has been identified in the S1904. In the write request, the Module LBA that has been identified in the S1904 is specified.

In the present embodiment, with reference to the LU management information 703, a Module number and a Module LBA are identified from an LU number and an LU LBA. However, in the case in which these values can be calculated, a Module number and a Module LBA can be calculated from an LU number and an LU LBA without using the LU management information 703.

Figure 20:
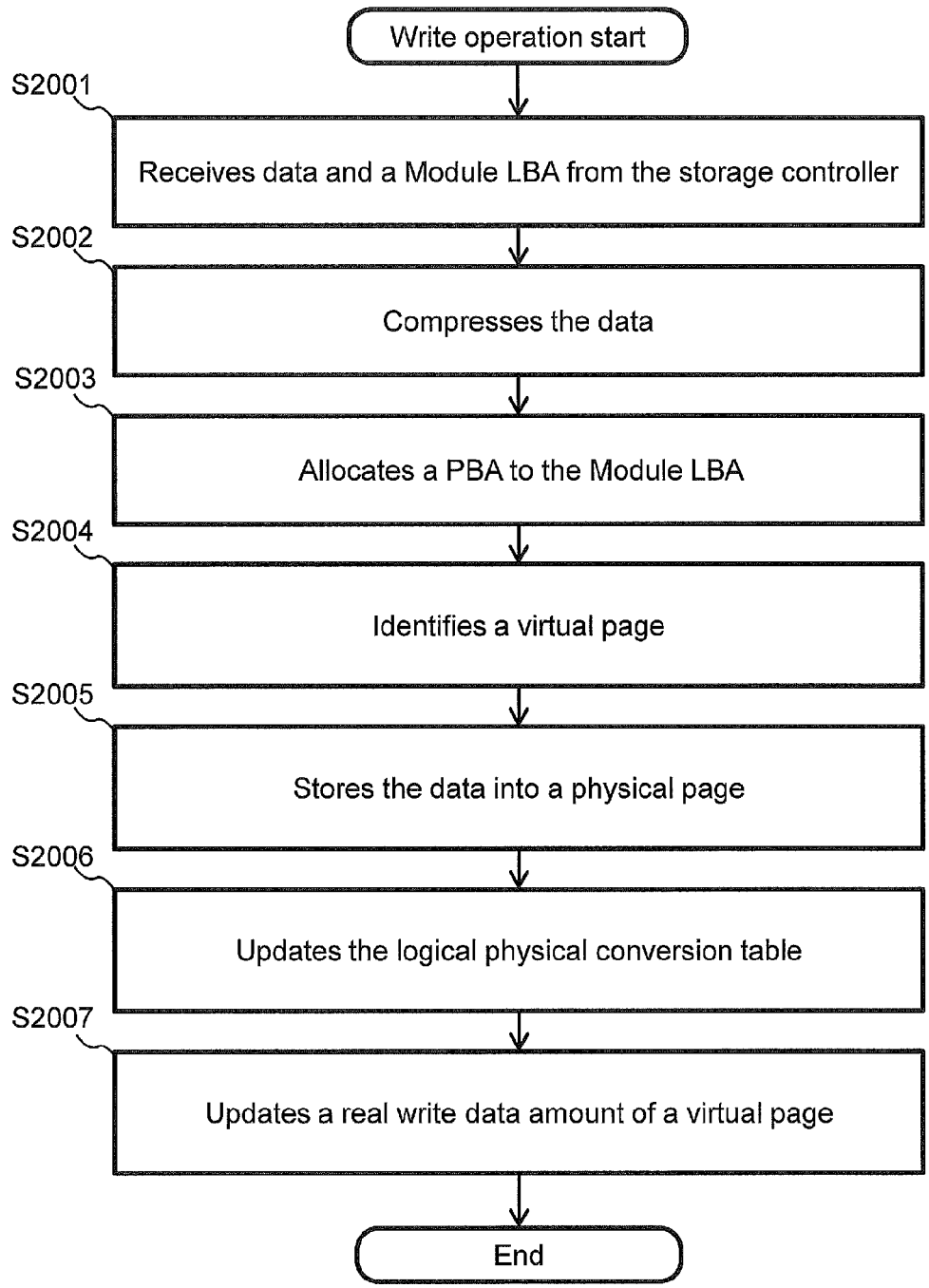
FIG. 20 is a view showing a flow of a write operation of an FM module in accordance with an embodiment 1.

FIG. 20 is a view showing a flow of a write operation of the FM module 110.

In the S2001, the FM module 110 receives a write request and the data that have been transmitted in the S1905 of FIG. 19 from the storage controller 121. In the write request, a Module LBA is specified. The data that has been received is a part of the write target data that has been transmitted from the host 103 or a parity that has been created based on f the write target data.

In the S2002, the FM module 110 compresses the data that has been received in the S2001.

In the S2003, the FM module 110 allocates a PBA to the Module LBA that has been received in the S2001. In other words, the FM module 110 allocates a physical page that is a stored destination of data that has been compressed in the S2002 to a Module LBA region. This physical page is a physical page in which a status is "erasing" (that is, a free physical page) of physical pages that are managed by the FM module 110.

In the S2004, the FM module 110 refers to the logical physical conversion table 1301, and identifies the number of a virtual page to which the Module LBA that has been identified in the S2001 belongs.

In the S2005, the FM module 110 stores the data that has been compressed in the S2002 into a physical page of a PBA that has been identified in the S2003.

In the S2006, the FM module 110 updates the logical physical conversion table 1301.

More specifically, the FM module 110 registers a value of the PBA that has been acquired in the S2003 to the PBA column 1403 that is corresponded to the Module LBA that has been received in the S2001 for the logical physical conversion table 1301.

In the S2007, the FM module 110 updates a write data amount and a real write data amount for a virtual page that has been identified in the S2004 (referred to as a "target virtual page" in the description of FIG. 20). More specifically, the FM module 110 adds an amount of data that has been received in the S2001 to a value of the write data amount column 1402 that is corresponded to the target virtual page based on the write information 1303 of the target virtual page, and adds a size of a physical page that has been allocated in the S2003 to a value of the real write data amount column 1403 that is corresponded to the target virtual page.

An amount of data that has been stored as a practical matter in the S2005 is not an amount of data that has been received by the FM module 110 in the S2001 but a size of a physical page that has been allocated in the S2003. This is changed depending on a compression of data (S2002) and a reclamation processing that will be described later. In the case in which an amount of data that is stored as a practical matter is larger than an amount of data that has been received, the duration of life of the FM module 110 is shortened in some cases. The FM module 110 measures a real write data amount for every virtual page, holds a real write data amount for every virtual page in the virtual page write information 1303, and notifies the storage controller 121 of an amount of data that has been stored as a practical matter for every virtual page, whereby the storage controller 121 can comprehend a real write data amount for every virtual page and every virtual LU.

In the next place, a summary of a reclamation processing of the FM module 110 will be described in the following.

The FM chip 220 is provided with a characteristic of that overwriting is impossible. Consequently, the data after an update (updated data) of data that has been stored into a physical page that has been allocated to one Module LBA (data before an update) is stored into a physical page that is different from a physical page in which data before an update has been stored. Therefore, the FM module 110 is provided with a physical space (an aggregate of a plurality of physical blocks) larger than an LBA space (an aggregate of a plurality of Module LBA regions) that is released to the storage controller 121, and manages a region of a difference of a physical space and an LBA space. Hereafter this region is referred to as a spare region. In the case in which at least a certain update of data is executed for the FM module 110, a spare region is depleted. On the other hand, a region that is not corresponded to the Module LBA region (that is, a region that is not referred to by the storage controller 121), which is a physical page in which data before an update has been stored, is generated for the FM module 110. Hereafter a physical page that is not corresponded to the Module LBA region, which is a physical page in which data before an update (invalid data) has been stored, is referred to as an invalid page. Moreover, a physical page that is corresponded to the Module LBA region (a physical page in which updated data (valid data) has been stored) is referred to as a valid page.

In the case in which data is newly written for the FM module 110 in which a spare region is depleted, it is necessary to erase the data of an invalid page and to newly create a spare region. However, the FM chip 220 can erase data only in a unit of a physical block. For erasing data in a unit of a physical block, it is necessary that all physical pages that configure a physical block that is an erased target are invalid pages.

Consequently, the FM module 110 copies data of a valid page of a physical block that is an erased target to a free physical page of other physical block, and allocates a PBA of a physical page of a copy destination as substitute for a PBA of a physical page of a copy source to the Module LBA. By the above configuration, in the case in which all physical pages in a physical block are invalid pages, the FM module 110 erases all data in the physical block. This processing is called a reclamation processing.

In the case in which a reclamation processing is executed, data is copied for a valid page of a physical block that is an erased target, that is, a write occurs to the FM chip. Consequently, a real write data amount of the FM module 110 is increased, and as a result, the duration of life of the FM module 110 is shortened in some cases. Therefore, in the case in which a reclamation processing is executed, it is preferable that a physical block that is provided with the small number of valid pages is a physical block that is an erased target.

The number of valid pages that are included in a physical block that is an erased target is different depending on a write pattern of data. For instance, in the case of a sequential write (a write in which a continuous Module LBA is a write destination) or a write of data of a large size, the number of valid pages that are included in a physical block that is an erased target is less in general. This is because the updated data is stored in order into a physical page that is provided with the sequential physical blocks, whereby there is a high probability that invalid pages are collected to a predetermined physical block after a data update. On the other hand, in the case of a random write (a write in which a discontinuous Module LBA is a write destination), there is a high probability that the number of valid pages that are included in a physical block that is an erased target is large as compared with the case of a sequential write.

Consequently, an amount of data that is written to the FM chip as a practical matter in a reclamation processing is different depending on a write pattern to a virtual page. In the present embodiment, an amount of data that is written to the FM chip as a practical matter in a reclamation processing is measured to comprehend it as a consumed write cost that progresses a degradation of the storage system 101.

Figure 21:
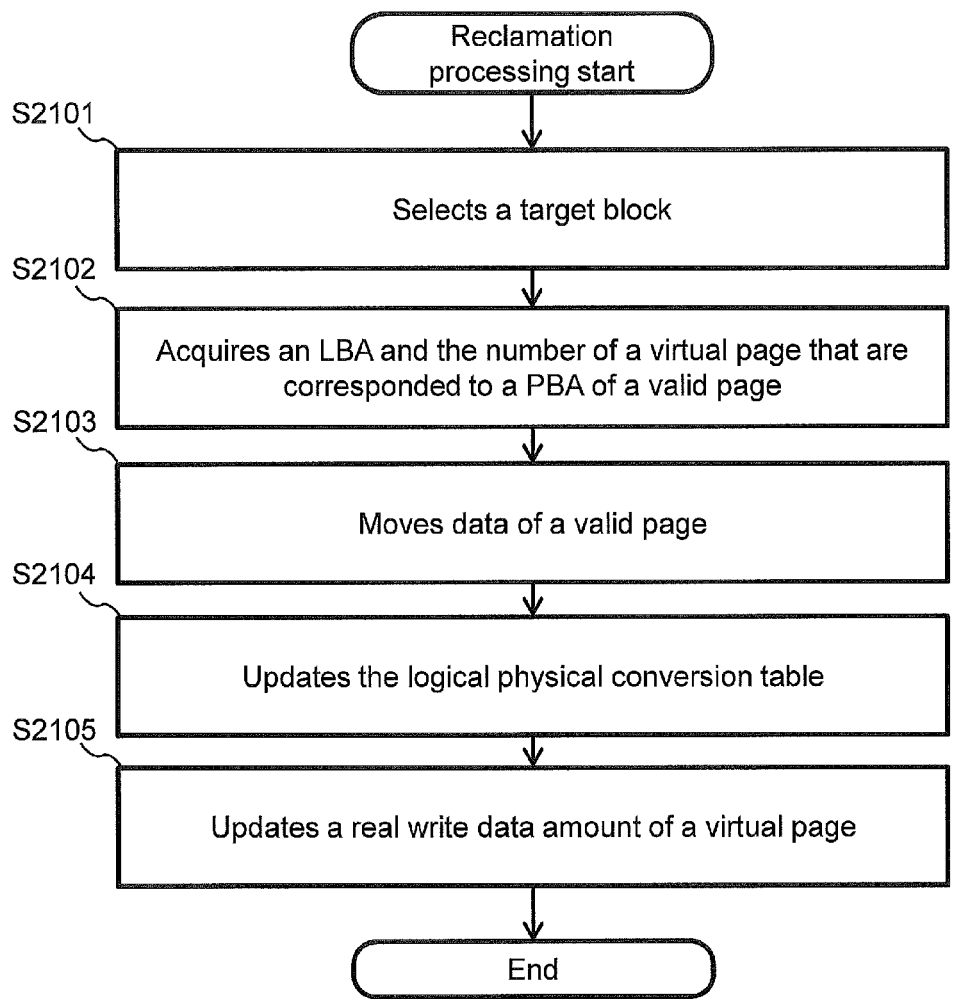
FIG. 21 is a view showing a flow of a reclamation processing in accordance with an embodiment 1.

FIG. 21 is a view showing a flow of a reclamation processing.

The reclamation processing is operated at a momentum of that an FM module 110 detects that a spare region that is managed by the FM module 110 is equal to or less than a predetermined size for instance.

In the S2101, the FM module 110 selects a physical block that is a target of a reclamation (hereafter referred to as a target block). At this time, the FM module 110 selects a physical block that is provided with less valid pages as a target block.

In the S2102, the FM module 110 executes the following processing:

selects a PBA of all valid pages of a target block (hereafter referred to as a target valid page); and refers to the logical physical conversion table 1301 and specifies the number of a virtual page that is corresponded to the specified PBA for each of the target valid pages.

In the S2103, the FM module 110 copies the valid data of all target valid pages to a free page of a physical block other than a target block (a copy destination page).

In the S2104, the FM module 110 modifies a PBA of the PBA column 1203 of the logical physical conversion table 1301 that is corresponded to the Module LBA to which a target valid page has been allocated from a PBA of a target valid page to a PBA of a copy destination page of the target valid page for all target valid pages (copy source pages).

In the S2105, the FM module 110 executes the following processing:

refers to the logical physical conversion table 1301 and identifies a virtual page that is corresponded to each copy destination page; and adds an amount of data that has been written to the copy destination page that has been executed in the S2103 to a value of the real write data amount column 1603 of the virtual page write information 1303 for each virtual page that has been identified.

By the above processing, it is possible to the real write data amount for every virtual page that occurs by a reclamation processing.

The above processing is a reclamation processing of the FM module 110. However, in addition to this processing, a refresh processing of the FM module 110 can also be executed. The refresh processing is a processing in which data of a physical block is copied to other physical block every when a certain time (for instance, one month) elapses from when data is written to the physical block (for instance, when data is stored into a predetermined page such as a leading page and trailing page) in order to implement the long term data storage of the FM chip 2208 in which a period of time in which data can be held (for instance, three months) is limited. The refresh processing and the reclamation processing described above are different from each other in only the start momentum and a selection of a target block. Consequently, an explanation using a flow is omitted.

The start momentum of a reclamation processing is when a spare region is equal to or less than a predetermined size. On the other hand, the start momentum of a refresh processing of a physical block is when a certain time elapses from when data is written to the physical block. The FM module 110 can update the real write data amount for every virtual page for the refresh processing similarly to the processing of the reclamation processing.

In the next place, a summary of a corresponding modification of a virtual LU and a virtual page (hereafter referred to as a VLU/VP mapping modification in some cases) will be described in the following.

In order to make the storage system 101 to be provided with a high performance, data that is provided with a high read/write frequency is stored into a storage device that is provided with a high performance in general. This is implemented by the corresponding of a suitable virtual page to the virtual LU 632. For instance, although a first virtual page that has been allocated to the virtual LU 632 is a virtual page based on a storage device that is provided with a low performance, a read/write frequency of the virtual page (that is, a read/real write data amount for every "period of a VLU/VP mapping modification") is high. In this case, the storage controller 121 copies data in the first virtual page to the second virtual page based on a storage device that is provided with a performance higher than that of a storage device that is a basis of the first virtual page, and allocates the second virtual page as substitute for the first virtual page to a virtual LU LBA region of an allocated destination of the first virtual page. By this configuration, the storage system 101 can be made to be provided with a high performance.

Figure 22:
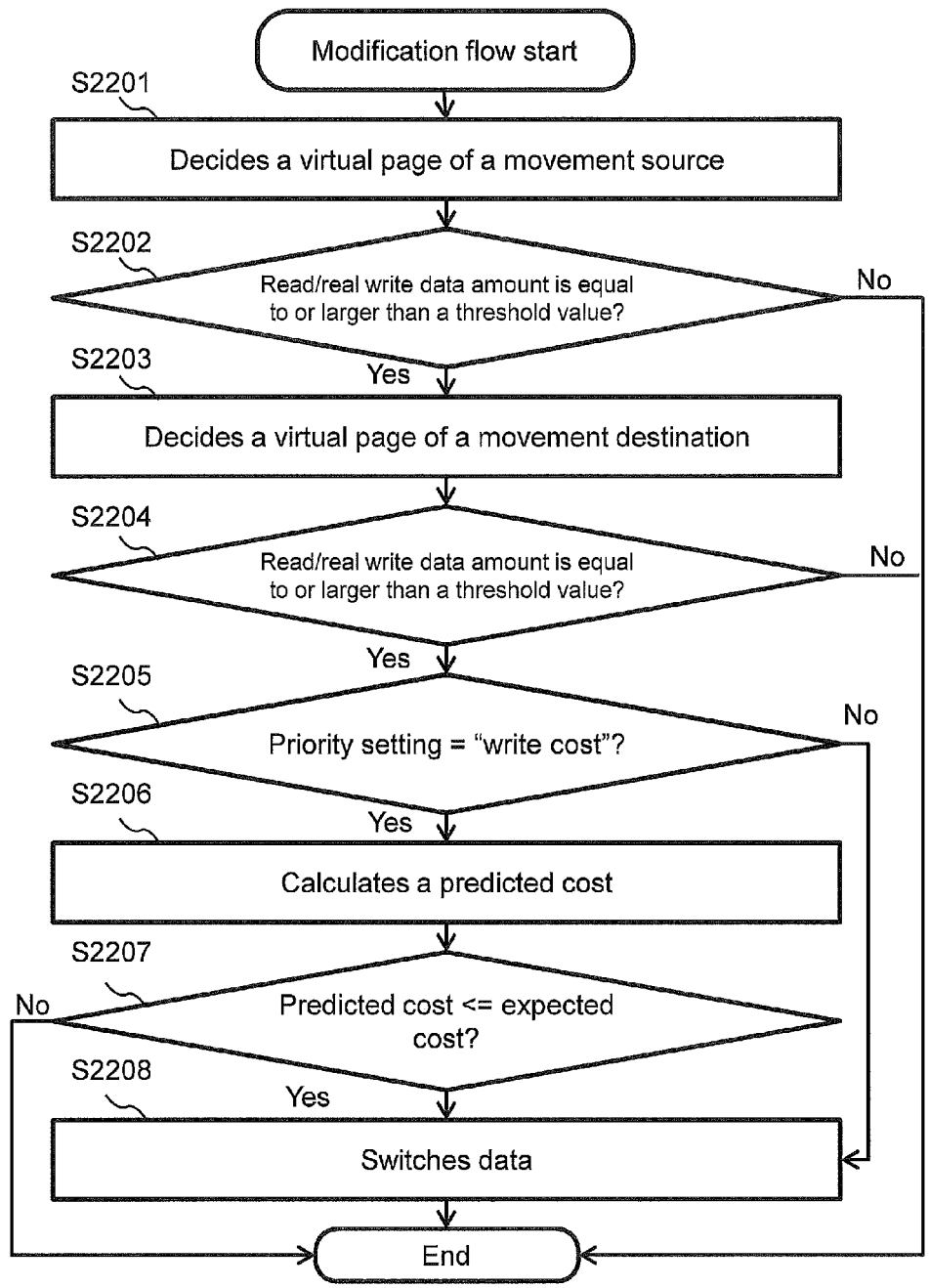
FIG. 22 is a view showing a flow of a virtual page corresponding modification in accordance with an embodiment 1.

FIG. 22 is a view showing a flow of a virtual page corresponding modification.

A flow of a virtual page corresponding modification is executed for every virtual page corresponding modification period that has been described before. Moreover, this modification is executed for a target of at least two virtual pages in which any one a bit cost, a write cost, and a performance is different. At this time, at least one virtual page is selected as a modification candidate from at least two pool LUs #2 to #6, and the corresponding with the virtual LUs #1 to #3 is modified with each other. A pool LU that is compared with each other is called an LU pair in the following.

This modification flow is executed for all LU pairs other than a pair of an LU #4 and an LU #5 that are configured by the same RAID Group #3 (see FIG. 6). In the following, a switching of a virtual page group of a pool LU #2 and a virtual page group of a pool LU #3 of FIG. 6 will be described as an example.

In the S2201, the storage controller 121 searches a virtual page of a movement source. The virtual page of a movement source is searched from a virtual page group of an LU that is provided with a performance lower than that of a movement destination. The pool LU #3 is based on a RAID Group #2 of an MLC FM module. The pool LU #2 is based on a RAID Group #1 of an SLC FM module. The LU #3 is provided with a performance lower than that of the LU #2. Consequently, a virtual page of a movement source is searched from the LU #3.

More specifically, the storage controller 121 executes the following processing:

refers to the read/write data information 707 of a virtual page that is shown in FIG. 12, and searches only a line on which a value of the LU number column 1201 is "3"; and identifies a virtual page in which a read/real write data amount is largest from the LU #3.

Here, a read/real write data amount is used for deciding a virtual page of a movement source. However, only any one of a read data amount and a real write data amount can also be used. Any one value of a read data amount and a real write data amount can be weighted, and a value that is obtained by adding those values can also be used. In the case in which there is a physical page in which a real write data amount is large, the duration of life of the storage device itself to which the physical page belongs is shortened. Consequently, in the case in which a virtual page based on the FM module of an MLC is a movement source, a value that is obtained by adding a read amount to a value that is obtained by weighting a real write data amount two times or more can also be used. In this case, a virtual page of a movement source is decided based on a read/real write data amount in which a real write data amount is emphasized.

In the S2202, the storage controller 121 judges whether or not a read/real write data amount of a virtual page of a movement source that has been decided in the S2201 is equal to or larger than a threshold value.

More specifically, the storage controller 121 executes the following processing:

refers to the read/write data information 707 of a virtual page that is shown in FIG. 12, and identifies the number of a virtual LU of an allocated destination of a virtual page of a movement source;

refers to the write cost table 706 of a virtual LU that is shown in FIG. 11, and identifies a priority setting that is corresponded to the virtual LU number that has been identified;

calculates a threshold value based on the priority setting that has been identified; and judges whether or not a read/real write data amount of a virtual page of a movement source that has been decided in the S2201 is equal to or larger than a threshold value.

In the case in which the result of the judgment is positive, a transition to the step S2203 is executed. On the other hand, in the case in which the result of the judgment is negative, the flow is terminated. This is because it is judged that a virtual page corresponding modification is not required for the LU pair (a pair of an LU #2 and an LU #3). The threshold value that is used for this judgment is calculated to a priority setting shown in FIG. 11. The calculation can also be based on a policy that has been set to the management apparatus 104. For instance, in the case in which a priority setting is a "performance", a threshold value of a read/real write data amount of a virtual page that has been corresponded to the virtual LU can also be lower as compared with the case in which a priority setting is a "bit cost". By this configuration, a virtual page that has been corresponded to the virtual LU in which a priority setting is a "performance" is a movement source even if a read/real write data amount is low, and is exchanged to a virtual page in which a read/real write data amount is high, thereby improving a performance.

In the S2203, the storage controller 121 searches a virtual page of a movement destination. The virtual page of a movement destination is searched from a pool LU that is provided with a performance higher than that of a pool LU that is provided with a virtual page of a movement source. The LU #2 is provided with a performance higher than that of the LU #3 for instance. Consequently, a virtual page of a movement destination is searched from the LU #2.

More specifically, the storage controller 121 executes the following processing:

refers to the read/write data information 707 of a virtual page that is shown in FIG. 12, and searches only a line on which a value of the LU number column 1201 is "2"; and identifies a virtual page in which a read/real write data amount is least as a movement destination from the pool LU #2.

In the case in which there is a plurality of virtual pages of a movement source, virtual pages of the number that is equivalent to that of virtual pages of a movement source that has been found in the S2201 can also be selected as a virtual page of a movement destination.

In the S2204, the storage controller 121 judges whether or not a read/real write data amount of a virtual page of a movement destination that has been decided in the S2203 is equal to or larger than a threshold value. The threshold value that is used for this judgment is equivalent to a threshold value that has been described in the S2202. For instance, in the case in which a priority setting is a "performance", a threshold value is higher as compared with the case in which a priority setting is a "bit cost". By this configuration, it is difficult that a virtual LU in which a priority setting is a "performance" is selected as a movement destination. A region that is continued to be allocated to a virtual page of a virtual LU in which a read/real write data amount is high is increased, thereby improving a performance.

More specifically, the storage controller 121 executes the following processing:

refers to the read/write data information 707 of a virtual page that is shown in FIG. 11, and identifies the number of a virtual LU to which a virtual page of a movement destination has been allocated;

refers to the write cost table 706 of a virtual LU that is shown in FIG. 10, and identifies a priority setting of the virtual LU that has been identified;

calculates a threshold value based on the priority setting that has been identified; and judges whether or not a read/real write data amount of a virtual page of a movement destination that has been decided in the S2203 is equal to or less than the threshold value that has been calculated.

In the case in which the result of the judgment is positive, a transition to the step S2205 is executed. On the other hand, in the case in which the result of the judgment is negative, the flow is terminated. This is because it is judged that a virtual page corresponding modification is not required for the LU pair (a pair of an LU #2 and an LU #3). The threshold value that is used for this judgment is calculated to a priority setting shown in FIG. 11. The calculation can also be based on a policy that has been set to the management apparatus 104.

In the S2205, the storage controller 121 judges whether or not a priority setting of a virtual LU that is corresponded to a virtual page of a movement source or a movement destination is a "write cost".

More specifically, the storage controller 121 executes the following processing:

judges whether or not a "write cost" is included in a priority setting of a virtual LU to which a virtual page of a movement source that has been identified in the step S2202 has been allocated; and judges whether or not a "write cost" is included in a priority setting of a virtual LU to which a virtual page of a movement destination that has been identified in the step S2205 has been allocated.

In the case in which a virtual page of a movement source or (and) a virtual page of a movement destination has been allocated to a virtual LU in which a priority setting is a "write cost", a transition to the step S2206 is executed. On the other hand, in the case in which a virtual page of a movement source or (and) a virtual page of a movement destination has not been allocated to a virtual LU in which a priority setting is a "write cost", a transition to the step S2208 is executed.

In the S2206, the storage controller 121 calculates a predicted write cost of a virtual LU. In this step, the storage controller 121 calculates a predicted write cost for all virtual LUs that are affected by a modification of a virtual page.

More specifically, the storage controller 121 executes the following processing:

refers to the read/write data information 707 of a virtual page, and specifies a real write data amount of a virtual page of a movement source;

refers to the read/write data information 707 of a virtual page, and identifies a pool LU that is provided with a virtual page of a movement destination;

refers to the storage device characteristic table 705 shown in FIG. 10, and identifies a write cost of a pool LU that has been identified (a pool LU that is provided with a virtual page of a movement destination) as a write cost of a pool LU of a movement destination;

calculates the product of a real write data amount of a virtual page of a movement source that has been obtained and a write cost of a pool LU of a movement destination as an increased amount of a write cost of each virtual LU in the case in which a virtual page is modified;

refers to the storage device characteristic table 705 shown in FIG. 10, and identifies a write cost of a pool LU that is provided with a virtual page of a movement source as a write cost of a pool LU of a movement source;

calculates the product of a real write data amount of a virtual page of a movement destination that has been specified and a write cost of a pool LU of a movement source as a decreased amount of a write cost of each virtual LU in the case in which a virtual page is modified;

calculates a difference of an increased amount of a write cost of each virtual LU and a decreased amount of a write cost of each virtual LU as a predicted value of an amount of a variation of a write cost; and calculates a predicted write cost by adding a predicted value of a write cost that has been calculated to a value of the predicted write cost column 1105 of each of the corresponded virtual LUs of the write cost table 706 of a virtual LU.

By the above steps, a write cost of a virtual LU that is predicted in a period of time up to the next virtual page corresponding modification (that is, a predicted write cost) can be calculated.

In the S2207, the storage controller 121 compares the predicted write cost that has been calculated in the step S2206 and an expected write cost.

More specifically, the storage controller 121 executes the following processing:

specifies a value of the expected write cost column 1103 of each of the corresponded virtual LUs of the write cost table 706; and judges whether or not the predicted write cost that has been calculated in the step S2206 is equal to or less than the expected write cost that has been obtained.

In the case in which the result of the judgment is positive, a transition to the step S2208 is executed. On the other hand, in the case in which the result of the judgment is negative, the flow is terminated. This is executed not to increase a write cost in such a manner that a write cost is larger than the expected write cost due to a virtual page corresponding modification since an LU pair assigns the priority to a write cost.

In the S2208, the storage controller 121 switches data of a virtual page that has been identified in the S2201 and data of a virtual page of a movement destination that has been identified in the S2203. In the present embodiment, a corresponding is not modified in such a manner that a virtual page of a movement destination and a virtual page of a movement source are directly switched with each other. More specifically, data is copied from a virtual page of a movement source to a free virtual page of a pool LU #2 that is provided with a virtual page of a movement destination, and data is copied from a virtual page of a movement destination to a virtual page of a movement source. Moreover, data can also be copied from a virtual page of a movement destination to a free virtual page of a pool LU #3 that is provided with a virtual page of a movement source, and data can also be copied from a virtual page of a movement source to a virtual page of a movement destination.

More specifically, the storage controller 121 executes the following processing:

copies data in a virtual page of a movement source to any free virtual page in a pool LU #2 that is provided with a virtual page of a movement destination;

refers to the virtual page number column 812 of the virtual LU management information 701 shown in FIG. 7, and rewrites the number of a virtual page a movement source to the number of a virtual page to which data in a virtual page a movement source has been copied;

copies data of a virtual page of a movement destination to a virtual page a movement source; and refers to the virtual page number column 812 of the virtual LU management information 701 shown in FIG. 7, and rewrites the number of a virtual page of a movement destination to the number of a virtual page a movement source.

By the above steps, this flow is terminated.

For the flow of the virtual page corresponding modification in accordance with the present embodiment, an availability of the corresponding modification is evaluated for a virtual page in which the priority setting 1102 is a "write cost" (see the S2205). However, an evaluation can also be carried out for a virtual page in which the priority setting 1102 is a "bit cost". More specifically for instance, the storage controller 121 manages the upper limit of a bit cost of each of the virtual LUs 632 (the upper limit can also be set by a user). The purpose of the management is to prevent a storage device that is provided with a high performance and a high bit cost from being utilized by a certain virtual LU by itself only. In the case in which a write cost and a bit cost are evaluated together, an increased amount of a bit cost of each of the virtual LUs 632 is calculated in the S2206. More specifically, the storage controller 121 executes the following processing:

identifies a pool LU that is provided with a virtual page of a movement destination from the LU number column 1201;

specifies a value of the bit cost column 1003 of the identified pool LU as a bit cost of a pool LU of a movement destination based on the storage device characteristic table 705 shown in FIG. 10;

calculates the product of a size of a virtual page of a movement source and a bit cost of a pool LU of a movement destination as an increased amount of a bit cost of the corresponding virtual LU;

calculates the product of a size of a virtual page of a movement source and a bit cost of a pool LU of a movement destination as a decreased amount of a bit cost of the corresponding virtual LU;

calculates a value that is obtained by subtracting a decreased amount of a bit cost from an increased amount of a bit cost of a virtual LU as a varied amount of a bit cost of the virtual LU; and calculates a predicted total bit cost of a virtual LU after the virtual page corresponding modification by adding a varied amount of a bit cost of the virtual LU to a current total bit cost (a total value of a bit cost of all virtual pages that configure the virtual LU).

In the S2207, the storage controller 121 executes a judgment of a write cost, that is, a judgment of whether or not a predicted write cost is equal to or less than an expected write cost, and executes a judgment of whether or not a predicted total bit cost is equal to or less than the upper limit of a bit cost.

In the case in which a total bit cost of a virtual LU is equal to or less than the upper limit of a bit cost that is set for every virtual LU by a user, a decision of a write cost is assigned the priority to. On the other hand, a total bit cost of a virtual LU exceeds the upper limit of a bit cost, the virtual page corresponding modification is not available regardless of a decision of a write cost (that is, even if a predicted write cost is equal to or less than an expected write cost). As described above, an availability judgment of the virtual page corresponding modification can also be carried out while using a write cost and a bit cost individually.

The flow of the virtual page corresponding modification can also be carried out while using a value that is obtained by adding a write cost to a bit cost. In this case, a predicted write cost and a predicted total write cost that have been calculated in the step S2206 can be summed up for instance, and an availability judgment of the virtual page corresponding modification can also be carried out by comparing the total sum value and a value that can be specified by a user in the step S2207. By this configuration, a write cost and a bit cost can be limited up to the upper limit of a cost that is expected by a user.

Figure 23:
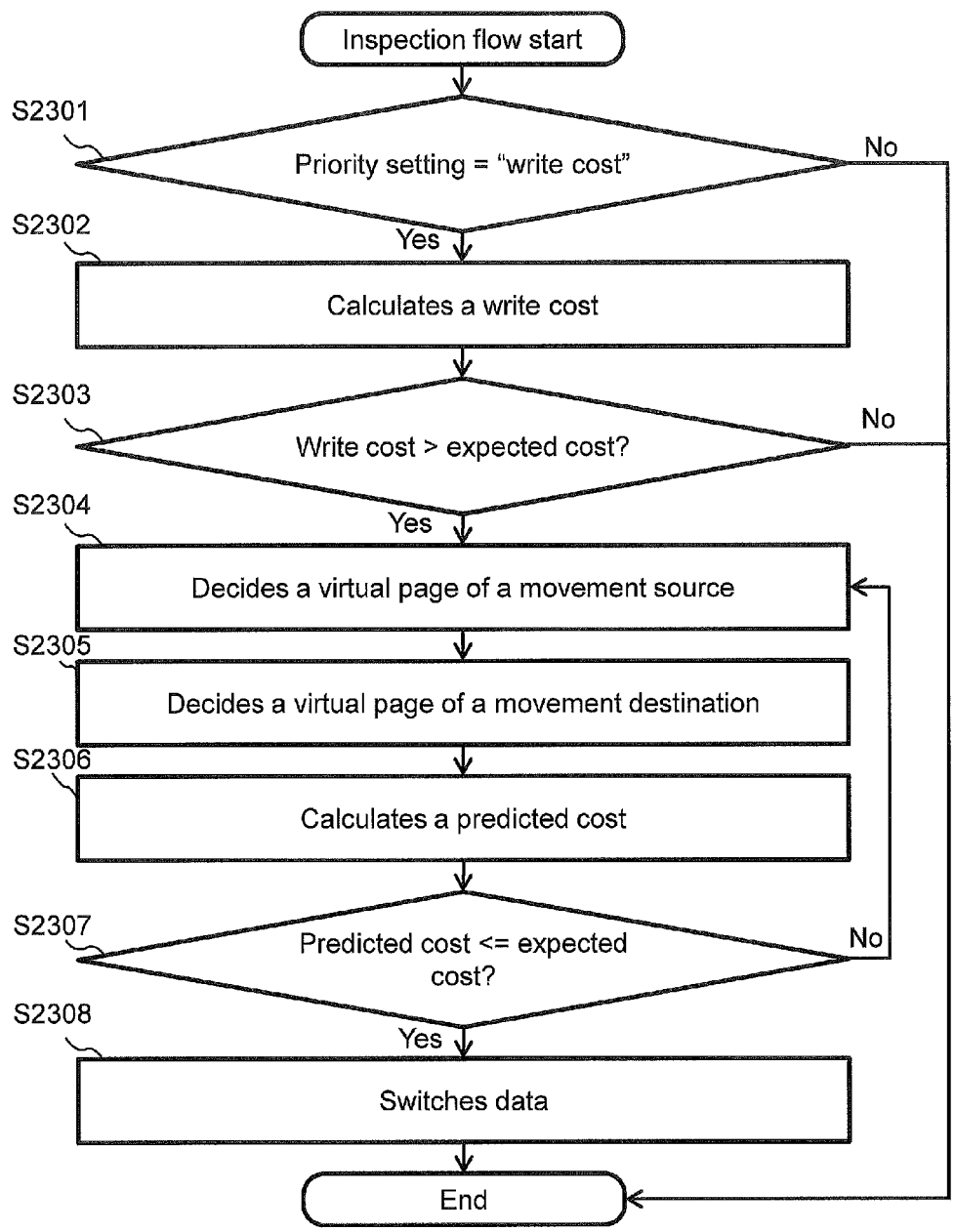
FIG. 23 is a view showing a flow of a write cost inspection in accordance with an embodiment 1.

FIG. 23 is a view showing a flow of a write cost inspection. A flow of a write cost inspection is executed for every virtual page corresponding modification period that has been described before. Moreover, this write cost inspection is executed for every virtual LU for a target of all virtual LU 632 that is managed by the storage system 101.

In the S2301, the storage controller 121 judges whether or not a priority setting of a virtual LU that is a target (hereafter referred to as a target virtual LU in the descriptions of FIG. 23) is a "write cost". More specifically, the storage controller 121 refers to the write cost table 706 and acquires a priority setting of a target virtual LU. In the case in which a priority setting of a target virtual LU is a "write cost", a transition to the step S2301 is executed. On the other hand, in the case in which a priority setting of a target virtual LU is not a "write cost", the flow is terminated.

In the S2302, the storage controller 121 calculates a measured write cost of a target virtual LU. More specifically, the storage controller 121 executes the following processing:

requests to notify all FM modules that are basis of a pool LU that is provided with a virtual page that has been allocated to the target virtual LU of a real write data amount;

receives a notification based on the virtual page write information 1303 (a notification that indicates a combination of an LBA of each virtual page and a real write data amount) from a plurality of FM modules that have received the request, and adds the total value of a real write data amount that is indicated by the notification to a value of the real write amount columns 804 and 806 of each pool LU of the write data amount management information 704;

calculates the product of a value of the real write amount columns 804 and 806 of each normal LU and a value of the write cost column 904 of each pool LU of the storage device characteristic table 705; and records the calculated value to the measured write cost column 1004 of the target virtual LU of the write cost table 706.

It is also possible that the step S2302 is not executed in a write cost inspection but is executed on a periodic basis in a period that is shorter than the "virtual page corresponding modification period".

In the S2303, the storage controller 121 judges whether or not the measured write cost that has been calculated in the S2302 is larger than an expected write cost. More specifically, the storage controller 121 refers to the write cost table 706 and compares the measured write cost of the target virtual LU and the expected write cost. In the case in which the measured write cost is equal to or less than the expected write cost, the flow is terminated. This is because it is judged that the target virtual LU is operated in the range of a write cost that is expected by a user. On the other hand, in the case in which the measured write cost is larger than the expected write cost, a transition to the step S2304 is executed. This is because it is judged that the target virtual LU is operated exceeding a value that is expected by a user.

In the S2304, the storage controller 121 identifies a virtual page in which a write cost is high as a virtual page of a movement source from a virtual page group that has been allocated to the target virtual LU. More specifically, the storage controller 121 executes the following processing:

refers to the virtual LU management information 701, and identifies a virtual page number of a virtual page group that has been corresponded to a virtual LU (hereafter referred to as a target virtual page group);

identifies an LU number of each pool LU that is provided with at least one virtual page that configures a target virtual page group from the Volume Pool management information 702;

identifies a write cost of each pool LU that has been identified from the storage device characteristic table 705;

refers to the read/write information 708 of a virtual page, and identifies a real write data amount in order from a virtual page that is included in a pool LU in which a write cost is high; and identifies one or a plurality virtual pages in which a real write data amount that has been obtained is relatively high as a virtual page of a movement source for a target virtual page group.

At this time, a virtual page of a movement source that is selected can be a virtual page in which a real write data amount is highest, or can be a virtual page in which a real write data amount is higher than an average value in the case in which a searching time is shortened. By this method, a virtual page in which a write cost is high can be a virtual page of a movement source by acquiring a virtual page in which a real write data amount is large from a plurality of virtual pages that have been corresponded to a normal LU in which a write cost is high.

In the S2305, the storage controller 121 decides a virtual page in which a write cost is low as a virtual page of a movement destination. More specifically, the storage controller 121 executes the following processing:

identifies an LU number of a pool LU that is provided with a virtual page of a movement source that has been identified in the S2304;

refers to the storage device characteristic table 705, and identifies an LU number of a pool LU in which a write cost is lower than that of a pool LU that has been acquired or a pool LU in which a write cost is not required to be considered; and decides a virtual page that is included in a pool LU that has been identified as a virtual page of a movement destination.

In the S2306, the storage controller 121 calculates a predicted write cost in the case in which a virtual page of a movement source and a virtual page of a movement destination are switched with each other. Since this step is equivalent to a step of the S1706 shown in FIG. 17, the description of this step is omitted.

In the S2307, the storage controller 121 judges whether or not a predicted write cost that has been calculated in the S2306 is equal to or less than an expected write cost that has been specified by a user. More specifically, the storage controller 121 executes the following processing:

refers to the write cost table 706 of a virtual LU, and identifies an expected write cost of a target virtual LU; and judges whether or not a predicted write cost that has been calculated in the S2306 is equal to or less than an expected write cost that has been acquired.

In the case in which the result of the judgment is positive, a transition to the step S2308 is executed. This is because it is predicted that a write cost can be limited up to an expected value that has been specified by a user. On the other hand, in the case in which the result of the judgment is negative, the flow is returned to the S2304. This is because it is judged that it is necessary to further reduce a write cost and the candidates of a virtual page of a movement destination and a virtual page of a movement source are newly acquired in addition to a virtual page of a movement destination and a virtual page of a movement source that have been acquired. By this S2307, the storage controller 121 continues to increase a virtual page of a movement source and a virtual page of a movement destination until a predicted write cost that is calculated in the S2306 becomes equal to or less than an expected write cost.

Since the step S2308 is equivalent to a step of the S2208 shown in FIG. 22, the description of this step is omitted.

In the case in which the write cost inspection flow described above is executed on a regular basis, the storage controller 121 can make a write cost to be equal to or less than an expected value for a virtual LU in which a priority setting is a "write cost", whereby a suitable write cost management can be carried out. In particular, in the case in which the write cost inspection flow is executed on a regular basis, the storage controller 121 can limit a write cost of an arbitrary service of a plurality of services that shares the hierarchical storage system 101. By this limitation, a service in which a write cost has an upper limit can be prevented from executing a write of large amount for the storage system 101, and the duration of life of an FM module can be prevented from being shortened beyond an expectation.

In the case in which a flow of the virtual page corresponding modification shown in FIG. 22 and a flow of the write cost inspection shown in FIG. 23 are repeated, a corresponding modification of a virtual LBA region and a storage device (a virtual page) is repeated. This configuration is provided with the following effects:

(1) there is an increasing probability that a virtual LBA region in which a read amount and a real write data amount are large is corresponded to a storage device in which a bit cost and a performance are high and a write cost is low (for instance, an SLC) for a virtual LU in which a priority setting is a "write cost";

(2) there is an increasing probability that a virtual LBA region in which only a read amount is large is corresponded to a storage device in which a bit cost is low to a certain degree and a performance and a write cost are high (for instance, an MLC) for a virtual LU in which a priority setting is a "write cost"; and (3) there is an increasing probability that a virtual LBA region in which a read amount and a real write data amount are less is corresponded to a storage device in which a bit cost, a write cost, and a performance are low (for instance, an HDD and a Tape) for a virtual LU in which a priority setting is a "write cost".

By this corresponding modification of a virtual LBA region and a virtual page (a storage device), an optimum solution can be implemented for a point of view of a trade-off of a reduction of a write cost and an improvement of an average performance.

In the next place, a summary of a degradation leveling operation will be described in the following.

Even in the case in which one FM module in which a write is disabled due to the degradation in an FM module group that configures the RAID Group 601, a utilization of the entire of the RAID Group 601 is disabled. Consequently, it is preferable that a degradation degree of an FM module group that configures the RAID Group 601 is uniform.

In the present embodiment, an operation for leveling the degradation of an FM module group that configures the RAID Group 601. This operation is referred to as a degradation leveling operation hereafter. In accordance with a degradation leveling operation, the storage controller 121 moves data in a region that is provided with a large write data amount from the FM module 110 that is most degraded in the RAID Group 601 to a region of the FM module 110 that is not so degraded in the RAID Group 601, thereby leveling the degradation of the FM module 110 that configures the RAID Group 601.

However, in the case in which a region of a movement source is selected by using a write data amount of the FM module 110 that can be measured by the storage controller 121, there is a possibility that an expected leveling of the degradation cannot be achieved. The reason is that a write data amount and a real write data amount of the FM module 110 are different from each other as described earlier.

For instance, a certain FM module is provided with a region A and a region B. The FM module receives data of 1 GB of which a write destination is the region A for one hour and receives data of 2 GB of which a write destination is the region B for one hour. The data of which a write destination is the region A is provided with little regularity (a random degree is high), and an effect of the elimination of duplicated data and an effect of a reduction of data due to a compression are low in the FM module. On the other hand, the write data of which a write destination is the region B is provided with the regularity, and an effect of the elimination of duplicated data and an effect of a reduction of data due to a compression are high in the FM module. At this time, it is hard to compress data of the region A, and a real write data amount of the region A is 3 GB for instance, which is three times of 1 GB, including a wear leveling described later. Moreover, data of which a write destination is the region B is reduced due to a compression, and a real write data amount of the region B is 1 GB for instance, which is half of 2 GB, including a wear leveling described later.

In the case in which the storage controller 121 selects a region of a movement source based on a write data amount of the FM module 110 in this case, the region A is selected as a region of a movement source regardless of that it is appropriate that the region B in which a real write data amount is large is selected as a region of a movement source to reduce the degradation.

To such a problem, in the present embodiment, the storage controller 121 selects a region in which a real write data amount is large in the FM module 110 in which a degree of the degradation is large based on a real write data amount for every virtual page. Moreover, the storage controller 121 moves the data in the region to a region of other FM module 110 in which a degree of the degradation is relatively small in the same RAID Group 601, thereby leveling the degradation of the FM module group that configures the RAID Group 601. To implement such a configuration, it is necessary that a configuration of the starting position of an individual virtual page that is configured by the RAID Group 601 is different from a configuration of an FM module group that configures the RAID Group 601. For instance, in the case in which the RAID Group 601 is configured by four FM modules (hereafter referred to as FM module numbers 0, 1, 2, and 3), a virtual page number x is allocated by an FM module starting from 0 and FM module numbers 0, 1, 2, 3, 0, 1, 2, 3, and 0 are allocated in series as an address. Moreover, the next virtual page number x+1 is allocated by an FM module starting from 1 and FM module numbers 1, 2, 3, 0, 1, 2, 3, 0, and 1 are allocated in series as an address. Similarly, a virtual page number x+2 is allocated by virtual modules 2, 3, 0, 1, 2, 3, 0, 1, and 2, a virtual page number x+3 is allocated by virtual modules 3, 0, 1, 2, 3, 0, 1, 2, and 3, and a virtual page number x+4 is allocated by virtual modules 0, 1, 2, 3, 0, 1, 2, 3, and 0 that are equivalent to those of the virtual page number x. As described above, every when a virtual page number is incremented by one, an FM module to which a starting address of a virtual page is corresponded is modified. Moreover, every when a virtual page number is incremented by four (the number of FM modules that configure the RAID Group 601), in the case in which a starting address of a virtual page is corresponded to the same FM module, data is exchanged between virtual pages in which a value of the remainder when divided by the number of FM modules that configure the RAID Group is different from each other among virtual pages that configure the same RAID Group, thereby leveling the degradation of the FM module group that configures the RAID Group. In the example described above, in the case in which a virtual page number 33 is tried to be exchanged with a virtual page of the same RAID Group in order to level the degradation for instance, since the remainder is 1 when the virtual page number 33 is divided by 4, data is exchanged with other than a virtual page in which the remainder is 1 when the virtual page number of the same RAID Group is divided by 4, thereby leveling the degradation of the FM module group that configures the RAID Group 601. This is effective for a RAID level in which the parity is stored to different FM module such as a RAID5 and a RAID6 in particular.

Figure 24:
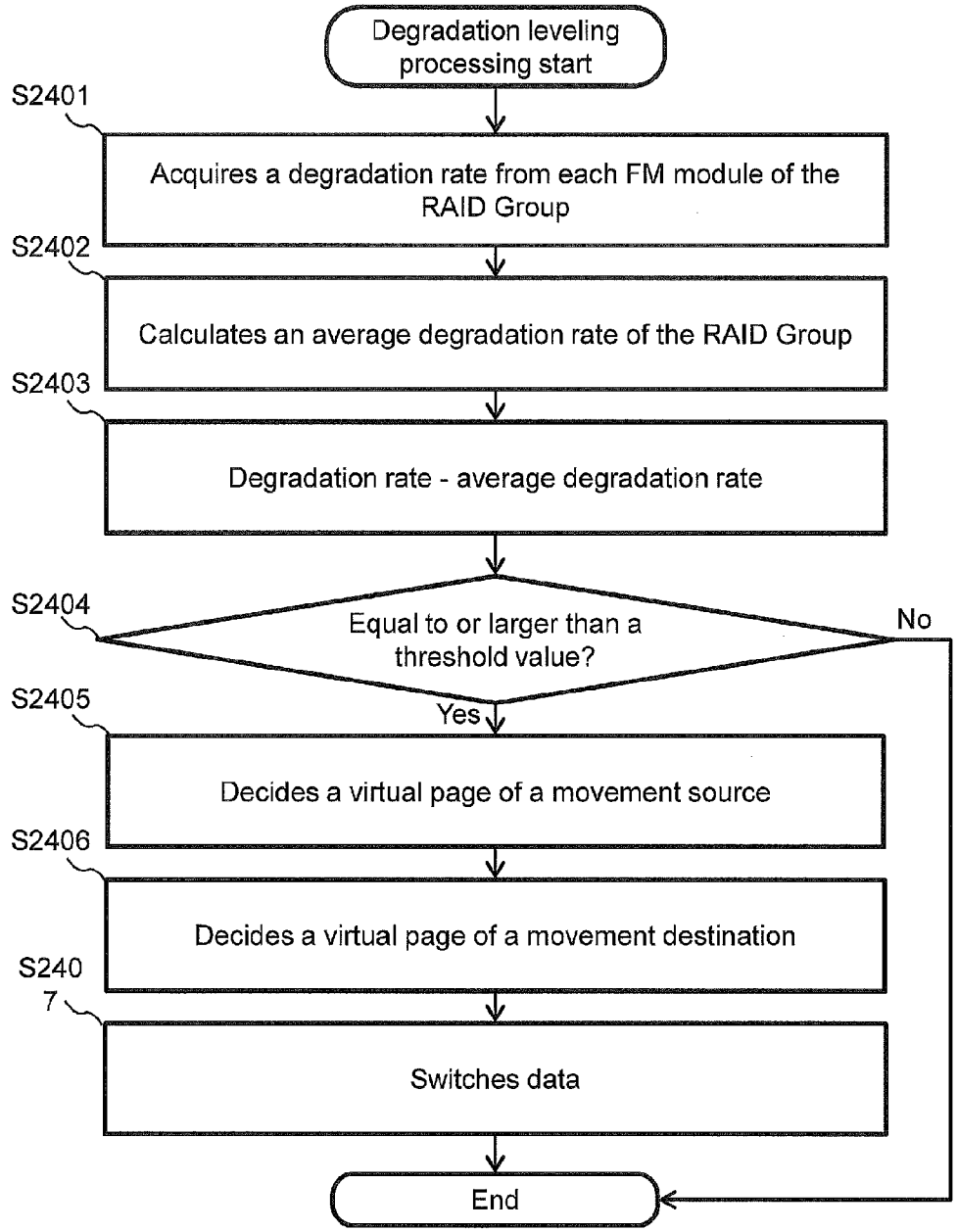
FIG. 24 is a view showing a flow of a degradation leveling operation in accordance with an embodiment 1.

FIG. 24 is a view showing a flow of a degradation leveling operation.

The degradation leveling operation is executed by the storage controller 121 on a regular basis (or on an irregular basis). The degradation leveling operation is executed to all RAID Groups 601 that are configured by a storage device in which a degree of the degradation is large due to a write.

In the S2401, the storage controller 121 refers to the block management information 1302, and specifies a degradation rate of each of the FM modules 110 that configure the RAID Group 601.

In the S2402, the storage controller 121 calculates an average degradation rate of the FM module group that configures the RAID Group 601 by the degradation rate of each FM module 110 that has been specified in the S2401. A value that is calculated by using a plurality of degradation rates can also be a value of other type such as a maximum value and a minimum value of the plurality of degradation rates as substitute for an average degradation rate.

In the S2403, the storage controller 121 calculates a difference of the average degradation rate that has been calculated in the S2402 and a degradation rate of each FM module 110.

In the S2404, the storage controller 121 judges whether or not a difference of a degradation rate of each FM module 110 and the average degradation rate that has been calculated in the S2403 is equal to or larger than a threshold value. In the case in which a difference of the degradation rate and the average degradation rate is less than a threshold value for all FM modules 110, the flow is terminated. This is because it is judged that it is not necessary that the FM modules 110 move data of a region in which a real write data amount is large to other region by a degradation leveling operation. On the other hand, in the case in which a difference of the degradation rate and the average degradation rate is equal to or larger than a threshold value for an FM module 110, a transition to the step S2405 is executed. This is because it is judged that it is necessary to move data of a region in which a real write data amount is large to other region of an FM module 110 by a degradation leveling operation.

In the S2405, the storage controller 121 acquires a region of a movement source from an FM module that is judged that a data migration to other FM module is required in the S2404 (hereafter referred to as a target FM module in the description of this step). More specifically, the following processing is executed:

the storage controller 121 gives an instruction to notify a target FM module of the number of a virtual page in which a real write data amount is large for the target FM module;

the target FM module that has receives the instruction refers to the virtual page write information 1303, and identifies a virtual page in which a real write data amount is large;

the target FM module transmits the virtual page number of the virtual page that has been identified to the storage controller 121; and the storage controller 121 that has acquired the number of the virtual page of a movement source divides the number by the number of FM modules that configure RAID Group and calculates the remainder.

By this step, the storage controller 121 recognizes the virtual page number that has been notified by the target FM module as the number of a virtual page of a movement source. The "virtual page in which a real write data amount is large" is a virtual page in which a real write data amount is larger than that of a virtual page of a movement destination described later, such as at least one virtual page in which a real write data amount is largest for the target FM module, at least one virtual page in which a real write data amount belongs to the upper X % (X>0) of all virtual pages that is a basis of the target FM module, and at least one virtual page in which a real write data amount is larger than a varied value (a threshold value) that is varied depending on a condition of the target FM module.

In the S2406, the storage controller 121 identifies a virtual page of a movement destination from other FM module 110 in the same RAID Group. More specifically, the following processing is executed:

the storage controller 121 gives an instruction to transfer the remainder that has been obtained by dividing the number of the virtual page of a movement source by the number of FM modules that configure the RAID Group in the calculation of the S2405 and to notify an FM module 110 in which a difference of the degradation rate and the average degradation rate of the FM module 110 that has been calculated in the S52403 is negative of the number of a virtual page to which a virtual page in which a real write data amount is small belongs;

the FM module 110 that has receives the instruction refers to the virtual page write information 1303, and identifies the number of a virtual page in which a real write data amount is small and in which the remainder that is obtained by dividing the number of the virtual page by the number of FM modules that configure the RAID Group is different from the remainder that is obtained by dividing the number of the virtual page of a movement source that has been received from the storage controller by the number of FM modules that configure the RAID Group; and the FM module 110 transmits the virtual page number of the virtual page that has been identified to the storage controller 121.

By this step, the storage controller 121 can acquire a virtual page in which a real write data amount is smaller of an FM module 110 in which a degradation degree is smaller than the average degradation rate of the RAID Group as a virtual page of a movement destination. The "virtual page in which a real write data amount is small" is a virtual page in which a real write data amount is smaller than that of a virtual page of a movement source, such as at least one virtual page in which a real write data amount is smallest for the target FM module, at least one virtual page in which a real write data amount belongs to the lower Y % (Y>0) of all virtual pages that is a basis of the target FM module, and at least one virtual page in which a real write data amount is smaller than a varied value (a threshold value) that is varied depending on a condition of the target FM module.

In the S2407, the storage controller 121 switches data of a virtual page of a movement source that has been identified in the S2405 and data of a virtual page of a movement destination that has been identified in the S2406. More specifically, the storage controller 121 executes the following processing:
reads data from a virtual page of a movement destination, and writes the data to a memory (such as a DRAM) 109;
copies data from a virtual page of a movement source to a virtual page of a movement destination;
refers to the virtual LU management information 701, and rewrites the virtual page number of a virtual page of a movement source to a virtual page number of a virtual page of a movement destination;
writes the data that has been written to the memory 109 (data of a virtual page of a movement destination) to a virtual page of a movement source (by this step, data of a virtual page of a movement destination is copied to a virtual page of a movement source); and
refers to the virtual LU management information 701, and rewrites the virtual page number of a virtual page of a movement destination to a virtual page number of a virtual page of a movement source.

By the above steps, the S2407 is terminated. In the present embodiment, a region of a movement source and a region of a movement destination are one virtual page, respectively (to be precise, a region of a movement source and a region of a movement destination are a physical storage region that belongs to a virtual page, respectively). However, at least one of a region of a movement source and a region of a movement destination can also be at least two virtual pages.

As described above, a degradation leveling operation is executed using a real write data amount of an FM chip, and a degradation rate of an FM module group that configures the same RAID Group is leveled. In the present embodiment, an example of a degradation leveling operation of an FM module group that configures the same RAID Group is described. However, the present invention is not restricted to this example. For instance, all of the degradation degree of an FM module group that configures an individual RAID Group 601 can be acquired from a plurality of RAID Groups 601, and the storage controller 121 can execute a leveling operation of the degradation for a plurality of RAID Groups 601. As described above, a region of a virtual LU 632 in which a real write data amount is relatively large can be found by using a real write data amount for every virtual page. Moreover similarly, a region of a virtual LU 632 in which a real write data amount is relatively small can also be found. Furthermore, a virtual page that is allocated to the corresponding region in the virtual LU 632 can be modified by a corresponding modification of the virtual LU 632 and a virtual page and a data copy. By this operation, a leveling operation of the degradation can be achieved.

By the steps that have been described above, the corresponding of a virtual page and an FM module is terminated. By this function, even in the case in which a configuration or an amount of a storage device that is mounted on the storage system 101 is varied, a correspondence relationship of a virtual page and an FM module with an Module LBA is updated in an appropriate manner, and a measurement of a real write data amount can be executed.

As described above, in the present embodiment, a real write data amount is measured for every virtual page, and the storage controller 121 acquires the real write data amount from an FM module on a regular basis (or on an irregular basis). The storage controller 121 then sums a real write data amount of all virtual pages that have been allocated to the virtual LU 632 for every virtual LU 632, whereby the storage controller 121 calculates a real write data amount for every virtual LU 632. Based on a real write data amount for every virtual LU 632, the storage controller 121 comprehends a degree in which the virtual LU 632 shortens the duration of life of the FM module 110, that is, a the duration of life of an apparatus that has been consumed by the virtual LU 632. Moreover, the storage controller 121 calculates a write cost that has been consumed by the virtual LU 632 based on a write data amount and a real write data amount for every virtual LU 632, and notifies a user via the management screen 104 of the write cost. Furthermore, the storage controller 121 varies the corresponding of the virtual LU 632 and a virtual page in such a manner that a write cost is limited up to an expected value that is set by a user.

In accordance with the present embodiment, even in the case in which the corresponding of each region of the virtual LU 632 with a storage device in which a write cost is different is dynamically varied automatically as a purpose of an improvement of an average apparatus performance, a write cost that occurs for every certain period up to a modification can be specified. By calculating an accumulated value of the write cost for every certain period, an accurate operation cost for every service that is provided by a host can be comprehended based on a relationship between a virtual LU 632 and a host (a service) that utilizes the virtual LU 632. For instance, in the case in which the storage system 101 is shared and utilized by a plurality of departments, a host 103 that is utilized is different from each other for every utilization department. Consequently, an appropriate obligation fee of the storage system 101 can be presented to every utilization department (that is, to every host and every virtual LU 632), whereby an impartial charging can be implemented. Moreover, a user can recognize the duration of life of the FM module 110 by a write cost that has been notified of. In the case in which a life extension of an apparatus is required, a life extension of an apparatus can be carried out in a proactive manner by modifying a data placement rule of the virtual LU 632.

Embodiment 2

An embodiment 2 will be described in the following. In the following descriptions, a different point from the embodiment 1 will be mainly described, and a description of a common point with the embodiment 1 will be omitted or simplified.

In the embodiment 1, in the case in which the corresponding of the Module LBA of the FM module 110 and a virtual page is modified, the storage controller 121 transmits the virtual page update information 1700 (the information that indicates the corresponding of an LBA of an FM module and a virtual page) shown in FIG. 17 to the FM module 110.

In the embodiment 2, the storage controller 121 notifies an FM module of the number of a virtual page that is corresponded to the Module LBA of the FM module 110 during a write.

Figure 25:
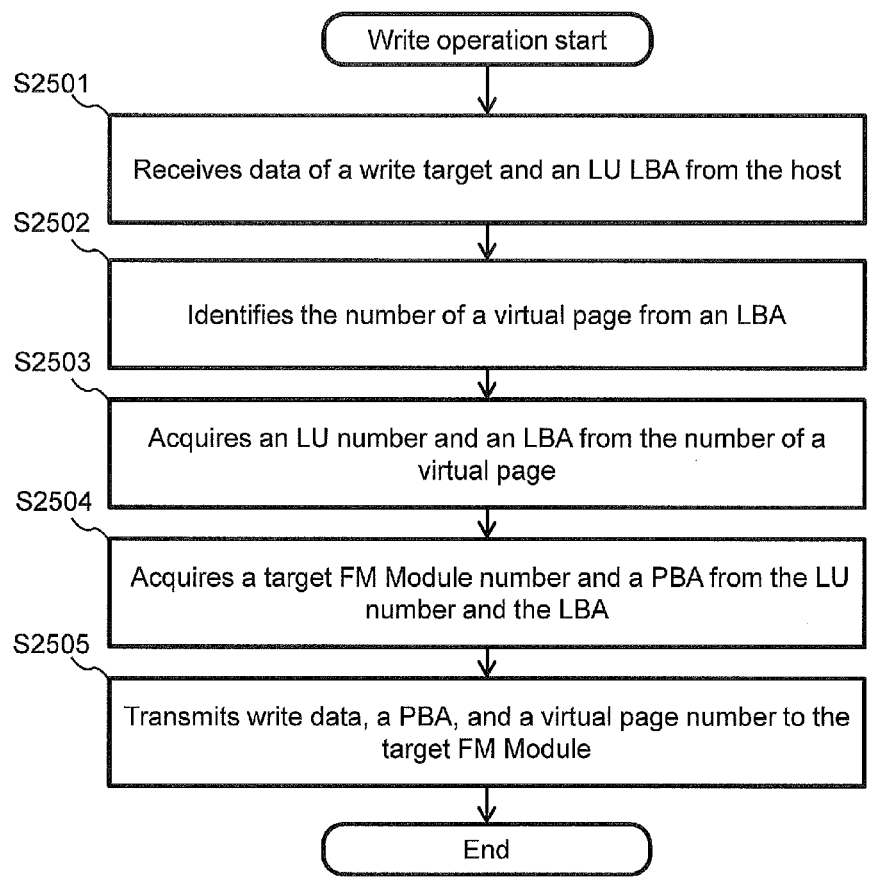
FIG. 25 is a view showing a flow of a write operation of a storage controller in accordance with an embodiment 2.

FIG. 25 is a view showing a flow of a write operation in accordance with the embodiment 2.

The storage controller 121 in accordance with the embodiment 2 transmits the virtual page information that indicates the correspondence relationship between the Module LBA and a virtual page of a write destination to the FM module 110 during a write of data.

In this write operation, the steps S1901 to S1904 are equivalent to an operation that is shown in FIG. 19. Consequently, only the step S2505 that is a step different from that of the embodiment 1 will be described.

In the S2505, the storage controller 121 transmits a virtual page number that has been acquired in the S1902 in addition to the write data and the Module LBA to the FM module 110.

Figure 26:
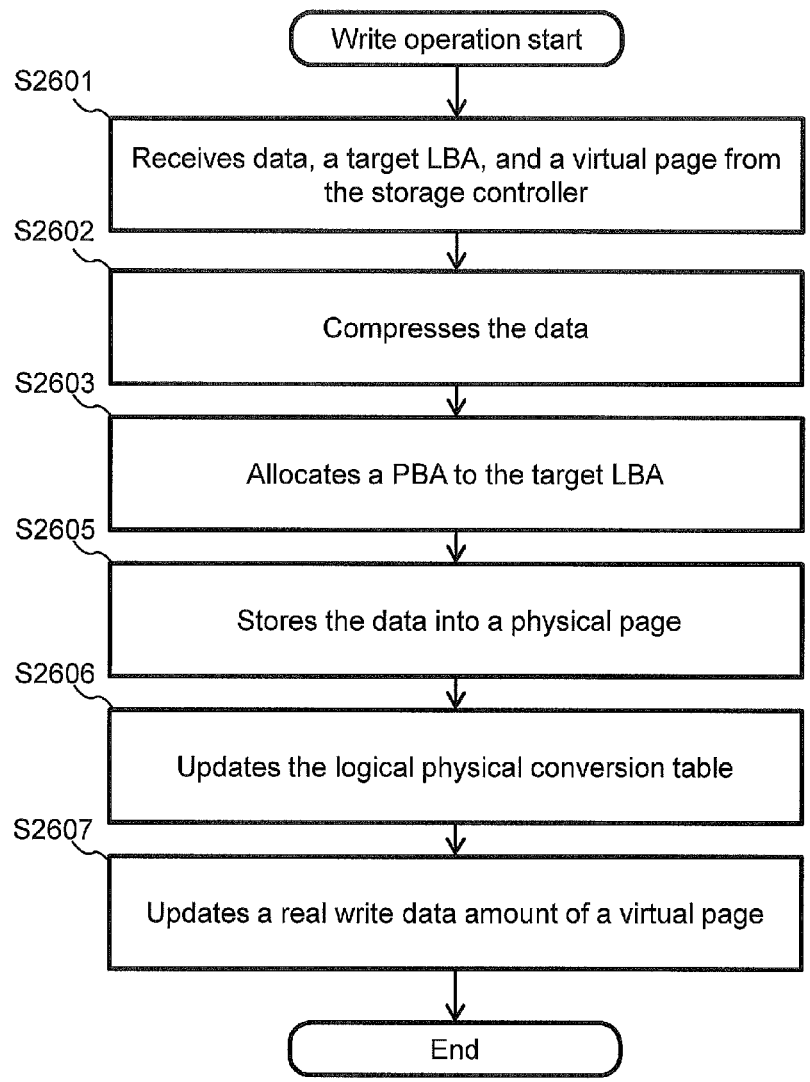
FIG. 26 is a view showing a flow of a write operation of an FM module in accordance with an embodiment 2.

FIG. 26 is a view showing a flow of a write operation of the FM module 110 in accordance with the embodiment 2.

In the write operation of the FM module 110 in accordance with the embodiment 2, the steps S2002 to S2005 and S2007 are equivalent to an operation that is shown in FIG. 20, and the step S2004 is not executed. Consequently, only the steps S2601 and S2606 that are steps different from that of the embodiment 1 will be described.

In the S2601, the FM module 110 receives the write data, the Module LBA, and a virtual page number from the storage controller 121.

In the S2606, the FM module 110 records a virtual page number that is corresponded to the Module LBA that has been received in the S2601 to the virtual page column 1402 of the logical physical conversion table 1301, and records a PBA that has been acquired in the S2003 to the PBA column 1403 of the logical physical conversion table 1301.

In accordance with the embodiment 2, even in the case in which the corresponding of a virtual page and an LBA of an FM module is modified, the LBA of the FM module and the number of a virtual page that has been corresponded to the LBA are transmitted during a write of data.

While the preferred embodiments in accordance with the present invention have been described above, the present invention is not restricted to the embodiments, and various changes, modifications, and functional additions can be thus made without departing from the scope of the present invention as a matter of course.

For instance, the storage controller 121 can transmit a write request and data to an FM module. The FM module can write the data to a physical page, measure an actual write amount, and include the actual write amount into a response to a write request from the storage controller 121 to return it. The storage controller 121 can add an actual write amount that is included in the response to a real write data amount that is corresponded to a virtual page of a write destination. By this configuration, every when the storage controller 121 transmits a write request to an FM module, a real write data amount of a virtual page of a write destination is updated.

In FIGS. 22 to 24, a free virtual page can be selected on a preferential basis as a virtual page of a movement destination. In this case, in FIGS. 22 to 24, although a migration of data is executed from a virtual page of a movement source to a virtual page of a movement destination, it is not necessary that a migration of data is executed from a virtual page of a movement destination to a virtual page of a movement source.

Reference Signs List

101: Storage system

The invention claimed is:

1. A storage system that is coupled to an upper level apparatus comprising:
a plurality of nonvolatile semiconductor storage devices; and
a storage controller that is coupled to the plurality of nonvolatile semiconductor storage devices and that provides an LU (logical unit) to the upper level apparatus,
wherein the storage controller is configured to receive a write request that specifies the LU from the upper level apparatus and to transmit a write command of a virtual page data unit based on data of a write target that conforms to the write request to a nonvolatile semiconductor storage device that is a basis of a storage region of a write destination of the plurality of nonvolatile semiconductor storage devices in accordance with the write request,
each of the nonvolatile semiconductor storage devices provided with a nonvolatile semiconductor storage medium and a medium controller that is a controller that is coupled to the nonvolatile semiconductor storage medium,
the medium controller configured to hold a real write data amount information that is used for specifying a real write data amount of a data unit that is written to the nonvolatile semiconductor storage medium,
(A) in the case in which the medium controller receives a write command and a data unit from the storage controller, the medium controller is configured to execute the following (a1) and (a2):
    (a1) the medium controller writes the data unit to a physical storage region of a write destination of the nonvolatile semiconductor storage medium in accordance with the write command; and
    (a2) the medium controller updates the real write data amount information based on an amount of a data unit that has been actually written in the (a1),
(B) the medium controller is configured to notify the storage controller of the real write data amount information on a regular basis or on an irregular basis, and
(C) the storage controller is configured to calculate a real write data amount of the LU based on the real write data amount information from the medium controller of each of the nonvolatile semiconductor storage devices;
wherein the logical unit is a virtual LU that is configured by a plurality of virtual regions,
the plurality of storage regions based on the plurality of nonvolatile semiconductor storage devices are a plurality of virtual pages,
in the case in which a virtual page has not been allocated to a virtual region of a write destination, the storage controller is configured to allocate a free virtual page to the virtual region of a write destination and to transmit a plurality of data units and a plurality of write commands based on the data of a write target to the plurality of nonvolatile semiconductor storage devices that are basis of the virtual page that has been allocated, the real write data amount information indicating a real write data amount for every virtual page, and
in the (C), the storage controller is configured to calculate a real write data amount for every virtual page based on the real write data amount information from each of the nonvolatile semiconductor storage devices and to calculate a real write data amount of the virtual LU based on the real write data amount from each of the virtual pages that have been allocated to the logical unit.

2. A storage system according to claim 1, wherein:
the storage system holds the storage device characteristic information that includes the information that indicates a write cost per unit storage capacity for every nonvolatile semiconductor storage device,
(D) the storage controller is configured to:
    (d1) execute the following (d11) to (d13) for every virtual page that has been allocated to the logical unit:

(d11) specify a nonvolatile semiconductor storage device that is a basis of a virtual page;

(d12) specify a write cost per unit storage capacity of the nonvolatile semiconductor storage device that has been specified in the (d11) from the storage device characteristic information; and (d13) calculate a write cost of a virtual page based on the write cost that has been specified in the (d12) and a real write data amount of a virtual page, and (d2) calculate a write cost of the virtual LU based on the real write data amount that has been calculated in the (d1) for every virtual page that has been allocated to the logical unit.

3. A storage system according to claim 2, wherein:
(E) the storage controller is configured to:
   (e1) judge whether or not the write cost that has been calculated in the (d2) exceeds the upper limit of a write cost of the virtual LU; and
   (e2) execute a page movement in the case in which the result of the judgment of the (e1) is positive, and
   in the page movement, the storage controller is configured to:
   (e21) decide a first virtual page as a movement source virtual page based on the write cost that has been calculated in the (d13) among a plurality of virtual pages that have been allocated to the virtual LU;
   (e22) decide a second virtual page based on a nonvolatile semiconductor storage device that is provided with a smaller write cost per unit storage capacity than that of a nonvolatile semiconductor storage device that is a basis of the movement source virtual page as a movement destination virtual page;
   (e23) move data from the movement source virtual page to the movement destination virtual page; and
   (e24) allocate the movement destination virtual page as substitute for the movement source virtual page to a virtual region of an allocated destination of the movement source virtual page.

4. A storage system according to claim 3, wherein:
the storage controller is configured to calculate a predicted write cost that is a write cost of the virtual LU in the case in which it is assumed that data is moved from the movement source virtual page to the movement destination virtual page in the page movement, and to execute the above (e23) and (e24) in the case in which the predicted write cost is equal to or less than the upper limit.

5. A storage system according to claim 4, wherein:
the storage controller is configured to execute the above (e1) on a regular basis or on an irregular basis.

6. A storage system according to claim 5, wherein:
the storage controller is configured to calculate the upper limit of a write cost of a virtual LU in the predetermined period of time from the upper limit of a write cost of a virtual LU in a period of time that is desired by a user.

7. A storage system according to claim 6, wherein:
the nonvolatile semiconductor storage medium is a NAND type flash memory that is provided with a plurality of NAND flash memory chips, the medium controller of each of the nonvolatile semiconductor storage devices is configured to hold the logical physical conversion information that includes a logical address of the flash memory, an ID of a virtual page to which the logical address belongs, and a physical address that is corresponded to the logical address, and
in the (a2), the medium controller is configured to identify a virtual page to which the logical address of a write destination belongs from the logical physical conversion information and to update the real write data amount information for the virtual page based on the number of physical pages and a size of a physical page to which a data unit has been written for the virtual page.

8. A storage system that is coupled to an upper level apparatus comprising:
a plurality of nonvolatile semiconductor storage devices; and
a storage controller that is coupled to the plurality of nonvolatile semiconductor storage devices and that provides an LU (logical unit) to the upper level apparatus,
wherein the storage controller is configured to receive a write request that specifies the LU from the upper level apparatus and to transmit a write command of a virtual page data unit based on data of a write target that conforms to the write request to a nonvolatile semiconductor storage device that is a basis of a storage region of a write destination of the plurality of nonvolatile semiconductor storage devices in accordance with the write request,
each of the nonvolatile semiconductor storage devices provided with a nonvolatile semiconductor storage medium and a medium controller that is a controller that is coupled to the nonvolatile semiconductor storage medium,
the medium controller configured to hold a real write data amount information that is used for specifying a real write data amount of a data unit that is written to the nonvolatile semiconductor storage medium,
(A) in the case in which the medium controller receives a write command and a data unit from the storage controller, the medium controller is configured to execute the following (a1) and (a2):
   (a1) the medium controller writes the data unit to a physical storage region of a write destination of the nonvolatile semiconductor storage medium in accordance with the write command; and
   (a2) the medium controller updates the real write data amount information based on an amount of a data unit that has been actually written in the (a1),
(B) the medium controller is configured to notify the storage controller of the real write data amount information on a regular basis or on an irregular basis, and
(C) the storage controller is configured to calculate a real write data amount of the LU based on the real write data amount information from the medium controller of each of the nonvolatile semiconductor storage devices; and
(E) the storage controller is configured to move data in a first storage region to a second storage region in which the real write data amount is smaller than that of the first storage region.

9. A storage system according to claim 8, wherein:
a storage region in which the real write data amount is large absolutely or relatively is a storage region in which the real write data amount is larger than a threshold value,
a priority setting for specifying a preferred object is executed for the LU, and
the threshold value is modified based on the priority setting of the LU.

10. A storage system according to claim 1, wherein:
the medium controller of the nonvolatile semiconductor storage device is configured to hold the logical physical conversion information that includes a logical address of the nonvolatile semiconductor storage medium, a physical address that is corresponded to the logical address, and a virtual page to which the logical address belongs, and in the (a2), the medium controller is configured to identify a virtual page to which the logical address of a write destination belongs from the logical physical conversion information and to update the real write data amount information for the virtual page based on the number of physical pages and a size of a physical page to which a data unit has been written for the virtual page.

11. A storage system according to claim 10, wherein:
the storage controller is configured to transmit the information that indicates a correspondence between the logical address and the virtual page to the nonvolatile semiconductor storage device in the case in which a correspondence relationship between the virtual page and the nonvolatile semiconductor storage device is modified or in the case in which a data unit is transmitted to the nonvolatile semiconductor storage device based on a write request from the upper level apparatus.

12. A storage system according to claim 1, wherein:
the nonvolatile semiconductor storage medium is a flash memory of a type in which data is erased in a block unit and data is read or written in a unit of a page that configures a block, and
the medium controller is configured to compress a data unit from the storage controller and to write the data unit to the nonvolatile semiconductor storage medium.

13. A storage system according to claim 1, wherein:
the plurality of nonvolatile semiconductor storage devices configure a RAID group, and
the storage controller is configured to:
(H) specify a device degradation rate that is a degradation rate of each of the nonvolatile semiconductor storage devices of the RAID group;
(I) calculate a group degradation rate that is a degradation rate based on a degradation rate of the plurality of nonvolatile semiconductor storage devices that configure the RAID group;
(J) judge whether or not there is a nonvolatile semiconductor storage device of which a device degradation rate is larger than the group degradation rate; and
(K) move data in a first virtual page among a plurality of virtual pages based on the RAID group to a second virtual page that is provided with a real write data amount smaller than that of the first virtual page among a plurality of virtual pages based on the RAID group in the case in which the result of the judgment of the (J) is positive.

* * * * *